May 10, 1960 L. B. COOKE ET AL 2,936,336

AUTOMATIC TELEPHONE ANSWERING AND MESSAGE RECORDING DEVICE

Filed Jan. 14, 1953 17 Sheets-Sheet 1

INVENTORS L. B. COOKE
C. R. KEITH

BY A. J. Kane

ATTORNEY

AUTOMATIC TELEPHONE ANSWERING AND MESSAGE RECORDING DEVICE

INVENTORS L. B. COOKE
C. R. KEITH
BY
A. F. Kane
ATTORNEY

AUTOMATIC TELEPHONE ANSWERING AND MESSAGE RECORDING DEVICE

Filed Jan. 14, 1953 17 Sheets-Sheet 3

INVENTORS L. B. COOKE
C. R. KEITH
BY A. F. Kane
ATTORNEY

AUTOMATIC TELEPHONE ANSWERING AND MESSAGE RECORDING DEVICE

Filed Jan. 14, 1953 17 Sheets-Sheet 4

INVENTORS L. B. COOKE
C. R. KEITH
BY A. J. Kane
ATTORNEY

INVENTORS: L. B. COOKE
C. R. KEITH
BY
G. F. Kane
ATTORNEY

INVENTORS L. B. COOKE
C. R. KEITH
BY
G. F. Kane
ATTORNEY

INVENTORS L. B. COOKE
C. R. KEITH
BY A. F. Kane
ATTORNEY

May 10, 1960 L. B. COOKE ET AL 2,936,336

AUTOMATIC TELEPHONE ANSWERING AND MESSAGE RECORDING DEVICE

Filed Jan. 14, 1953 17 Sheets-Sheet 8

INVENTORS L. B. COOKE
C. R. KEITH
BY G. F. Kane
ATTORNEY

INVENTORS L. B. COOKE
C. R. KEITH
BY
A. F. Kane
ATTORNEY

AUTOMATIC TELEPHONE ANSWERING AND MESSAGE RECORDING DEVICE

Filed Jan. 14, 1953 17 Sheets-Sheet 10

INVENTORS L. B. COOKE
C. R. KEITH
BY
G. J. Kane
ATTORNEY

INVENTORS L. B. COOKE
C. R. KEITH
BY G. J. Kane
ATTORNEY

INVENTORS L. B. COOKE
C. R. KEITH
BY
A. F. Kane
ATTORNEY

May 10, 1960 L. B. COOKE ET AL 2,936,336

AUTOMATIC TELEPHONE ANSWERING AND MESSAGE RECORDING DEVICE

Filed Jan. 14, 1953 17 Sheets-Sheet 13

INVENTORS L. B. COOKE
C. R. KEITH
BY G. F. Kane
ATTORNEY

AUTOMATIC TELEPHONE ANSWERING AND MESSAGE RECORDING DEVICE

INVENTORS L. B. COOKE
C. R. KEITH
BY
G. F. Kane
ATTORNEY

May 10, 1960 L. B. COOKE ET AL 2,936,336

AUTOMATIC TELEPHONE ANSWERING AND MESSAGE RECORDING DEVICE

Filed Jan. 14, 1953 17 Sheets-Sheet 15

INVENTORS L. B. COOKE
C. R. KEITH

BY G. F. Kane

ATTORNEY

INVENTORS L. B. COOKE
C. R. KEITH
BY G. H. Kane
ATTORNEY

May 10, 1960 L. B. COOKE ET AL 2,936,336

AUTOMATIC TELEPHONE ANSWERING AND MESSAGE RECORDING DEVICE

Filed Jan. 14, 1953 17 Sheets-Sheet 17

INVENTORS L. B. COOKE
C. R. KEITH

BY G. F. Kane

ATTORNEY

United States Patent Office 2,936,336

Patented May 10, 1960

2,936,336

AUTOMATIC TELEPHONE ANSWERING AND MESSAGE RECORDING DEVICE

Leighton B. Cooke, Madison, and Clyde R. Keith, Maplewood, N.J., assignors to Bell Telephone Laboratories, Incorporated, New York, N.Y., a corporation of New York Application January 14, 1953, Serial No. 331,232

5 Claims. (Cl. 179—6)

This invention relates to telephone systems involving the use of automatic telephone answering and message recording devices at subscribers' stations.

Telephone answering and message recording devices used at subscribers' stations function during the absence of the subscriber, or when the station is otherwise unattended, to recognize and automatically acknowledge telephone calls incoming to the station; to transmit to the calling party an advisory or informative message appraising him of the facts that the called subscriber is not available and that the station is equipped with facilities for recording a message should the calling party care to transmit one; and to record any message transmitted by the calling party for subsequent reproduction at the called station. They also provide facilities whereby the telephone set at the subscriber's station may be used to record the advisory message on the recorder and to listen to the reproduction of recorded messages. Invariably, the attainment of such features requires a coordinated system of electrical and mechanical controls.

It is the object of this invention to provide a simplified and otherwise improved system of coordinated controls for telephone answering and message recording devices which insures the best possible combination of efficiency, dependability and economy of operation.

In known systems of the type to which this invention is particularly applicable, each telephone call incoming to a subscriber's station is allocated a predetermined time interval for message recording purposes. During this interval the recording head and the recording medium move relative to one another whether or not the calling party elects to transmit a message, and they continue to do so for the entire interval irrespective of how much of the recording space, if any, is used for actual message recording. Successive message recordings on the recording medium, therefore, frequently if not invariably are spaced from one another by blank portions of the medium, or, in machine switching areas by recorded dial tone, with the result that potential recording space on the recording medium is wasted and its available recording capacity is never realized. Furthermore, the subscriber, during playback of recorded messages is required not only to listen during the reproduction of actual recordings, but also while the reproducing head traverses the unused portions of the recording medium. This not only results in loss of time but can be a source of annoyance to the subscriber. Also, it is apparent that under such conditions the central office equipment involved in the connection to the called station is tied up unnecessarily during those recording intervals in which the calling party elects not to transmit a message or transmits one of less than the minimum time allotted for such purpose.

In accordance with a particular feature of the invention not only is each call incoming to a subscriber's station assured an interval up to a predetermined time for message recording, but successive messages are recorded on the recording medium without appreciable space interruptions regardless of what portion of the predetermined time interval is used for actual recording assuming that the calling party hangs up when he completes his message, and irrespective of whether the calling subscriber, on some calls, elects not to transmit a message. Thus, the entire recording space on the recording medium is utilized for actual recordings; the playback cycle becomes substantially one continuous reproduction rather than a series of reproductions separated by time-consuming silent intervals of variable lengths; and unnecessary tie-ups of central office equipment are eliminated.

More specifically, this feature of the invention resides in the use of camming means which functions to measure a recording interval of predetermined time duration and means for indexing the camming means whenever the incoming message recorder is arrested in its message recording operation either at the termination of the timed interval, or prior thereto in the event the calling party, by disconnecting, elects not to transmit a message, or transmits one of less than the minimum time duration. Thus the recording medium is arrested either at the termination of the timed interval of predetermined duration or when the calling party disconnects prior to the termination of the timed interval, and the timing cam is simultaneously indexed, or restored to its starting position in readiness to start from zero position the timing of the next recording interval.

Another feature of the invention contemplates starting the recording cycle immediately at the end of the transmission of the talk-out message or announcement, regardless of the length of the latter within predetermined upper and lower limits. More particularly, provision is made for recording and reproducing outgoing messages of any length from twelve to thirty seconds without "dead" time between the end of such a message and the beginning of the recording of the incoming message. This is accomplished by means of an adjustable limit switch which is automatically positioned at the end of the travel of the announcement carriage during the recording of an announcement, so as to be actuated by means controlled by the announcement carriage upon reaching this position prior to recording an incoming message. The operation of the limit switch terminates the talk-out period, initiates the operation of the message recording component, and otherwise changes the condition of the equipment from one of transmitting or reproducing to one of recording.

In systems of the type to which this invention pertains it is essential that the talk-out component of the telephone answering and message recording device functions in such a manner and is so controlled in its operation as to be in condition to repeat the entire talk-out message on all calls incoming to the subscriber's station. To attain this objective it is necessary that the reproducing head of the talk-out component be returned to its normal or starting position with respect to the recording medium either at the termination of the answering period or at some prior time in the event the calling party should disconnect before the termination of the answering period. It has been the practice heretofore to cause the talk-out component to operate for the full talk-out or answer period irrespective of whether or not the calling party remains on the connection, and in those instances wherein an attempt has been made to include the so-called "calling party disconnect" feature in the operation of the device, it appears that the talk-out component is arrested in its operation at the time of the disconnect and no provision is made to return it to its normal starting position. In such latter cases the systems are defective in that on calls subsequent to the first call the talk-out component operates, if at all, to transmit only a portion of the answering announcement.

In accordance with a feature of this invention provision is made to reset the reproducing head to its start position with respect to the recording medium, not only at the expiration of the answering interval but also at any time prior to the expiration of the answering period should the calling party terminate the connection. More particularly, the carriage which supports the reproducing head of the talk-out component is automatically returned to its normal start position under control of electromechanical means which operates automatically at the end of the answering interval, or in response to a disconnect by the calling party. Thus it is that on each call incoming to the subscriber's station the talk-out component will operate from its start position regardless of the circumstances under which its operation was terminated on a preceding call.

In accordance with a further feature of the invention, erasure of messages recorded on the recording medium of the incoming message recording component can be effected only in response to the receipt of an incoming call signal at the subscriber's station which is preceded by the performance of several deliberate operations by the subscriber. More particularly, the subscriber must restore the recording head to its home or starting position; he must index, or reset to zero position a recording space indicator dial; and he must set the function switch at its "automatic answer" position. Under these conditions the control circuit is so conditioned that, upon receipt of the first incoming call signal, apparatus for effecting the erasure of previously recorded messages is set in operation and such messages are erased. The message, if any, identified with the call which initiates the erasure operation is then recorded and all subsequently received messages are recorded without the machine going through the erasure cycle. Thus it is impossible for the subscriber, accidentally or otherwise unwittingly, to effect the erasure of recorded messages.

These and other features of the invention will be readily understood from the following detailed description when read with reference to the accompanying drawings, in which:

Figs. 1, 2, 3 and 4 when assembled as indicated in Fig. 5, constitute a diagrammatic disclosure of the electrical and mechanical controls involved in the telephone answering and message recording device of this invention and include also a schematic showing of the central office equipment required in extending a telephone connection between calling and called subscribers' stations, the latter of which is equipped with a telephone answering and message recording device according to this invention;

Figure 1:
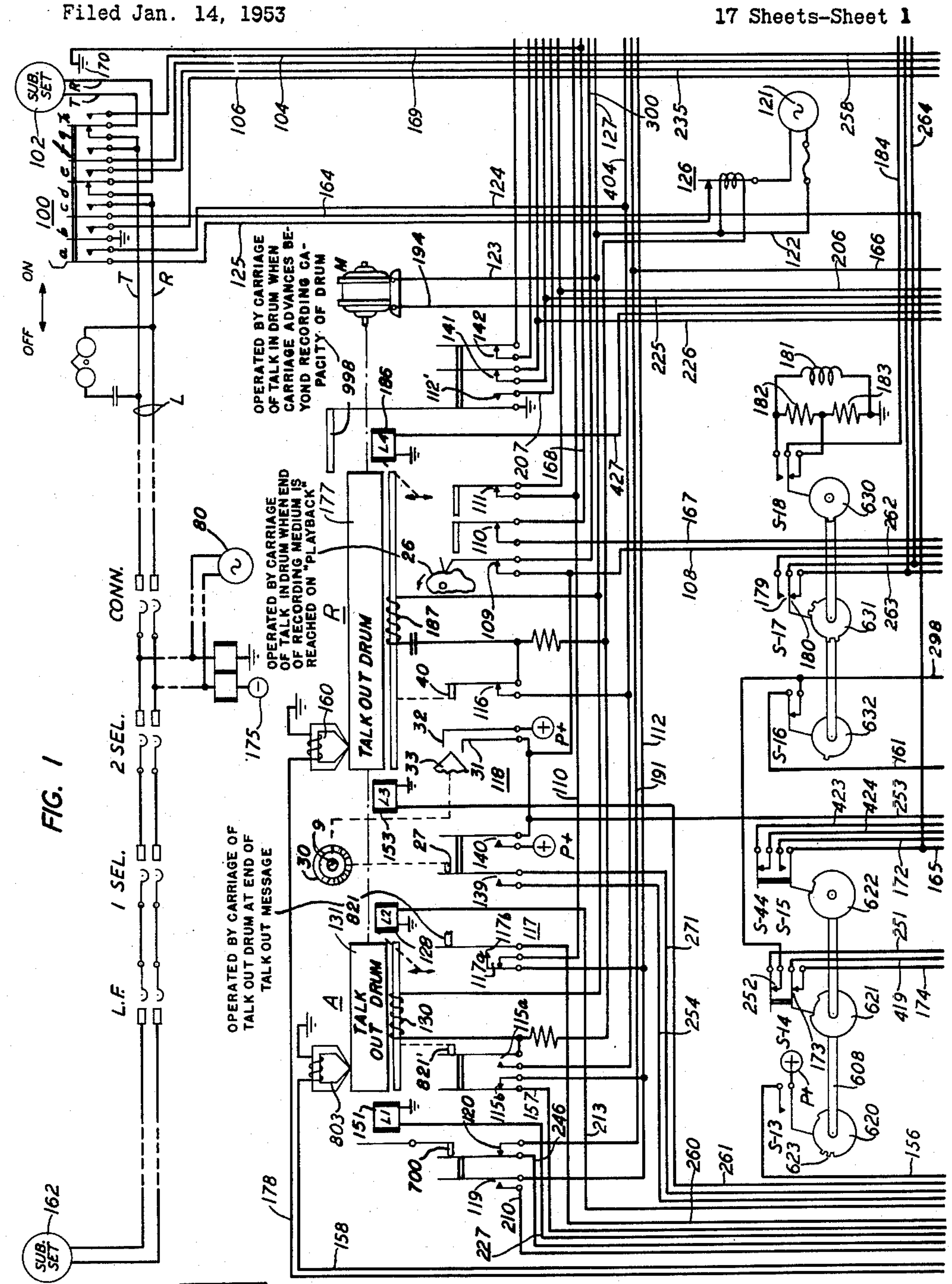
Figure 5:
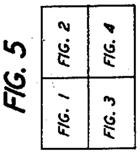

With respect to Figs. 7 to 33, inclusive, the description thereof will be limited in this application to essentials only, since a complete description of these figures from construction and operation viewpoints is contained in a patent application filed concurrently with this application in the names of C. R. Keith and C. A. Nickerson and which issued Sept. 4, 1956, as Patent No. 2,761,899. It will be observed that these figures of the drawings of the instant case correspond to Figs. 1 to 27, respectively, of the Keith-Nickerson drawings.

The entire mechanism of the telephone answering and message recording device of this invention is enclosed in a metal cabinet 2, the base of which is equipped with felt-covered feet 3 for use on a desk or table. On a front panel of the cabinet base are mounted the subscriber-operated controls which consist of a function knob 4, a start key 201, a stop key 205, an on-off switch knob 7, a playback volume control switch knob 8, a message scanning knob 9 and an indicator dial 30. Suitable lamp signals are located at 5, 13, and 14, the first a "dictate" signal, the second an "on-off" signal and the third a "ready" signal.

The mechanical parts within the cabinet consist principally of a motor, a belt drive, talk-out and talk-in recording drums, recording head carriages, lead screws, manual scanning and indicating means, circuit controlling cams, erase coils and a four-position function switch.

The device includes two recording drums 131 and 177, the former a talk-out drum and the latter a talk-in drum, which are mounted on a main shaft 602 (Fig. 10) but are not permanently geared thereto. The shaft 602 is driven by a 60-cycle single-phase induction motor M through a two-stage belt and pulley reduction. The belts indicated at 11 and 601 are endless and may be made of woven nylon. Each is tensioned by an adjustable idler pulley.

The drums 131 and 177 mounted on the main shaft 602 are each driven through a continuously rotating constant torque clutch 12. Each drum is kept from rotating by a pawl, pawl 700 for drum 131 (Fig. 13) and pawl 823 for drum 177, which engages a slot in the respective drum until withdrawn therefrom under the action of solenoids 151 and 153, respectively, permitting the drum to rotate.

Figures 13, 24:
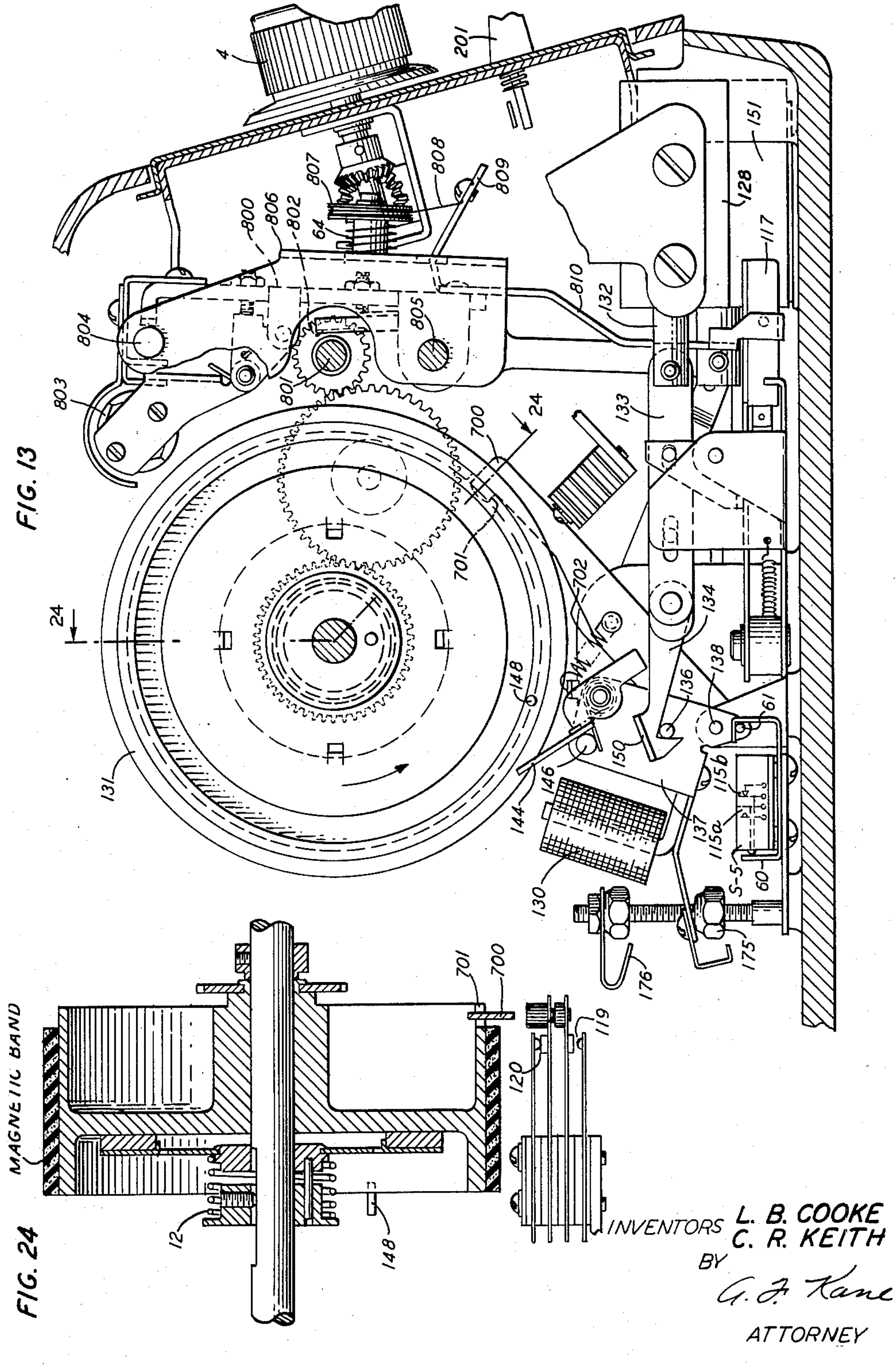
Fig. 13 is a transverse section of the device showing particularly the talk-out component.
Fig. 24 is a section taken along the line 24—24 of Fig. 13, looking in the direction of the arrows.
Figure 14:
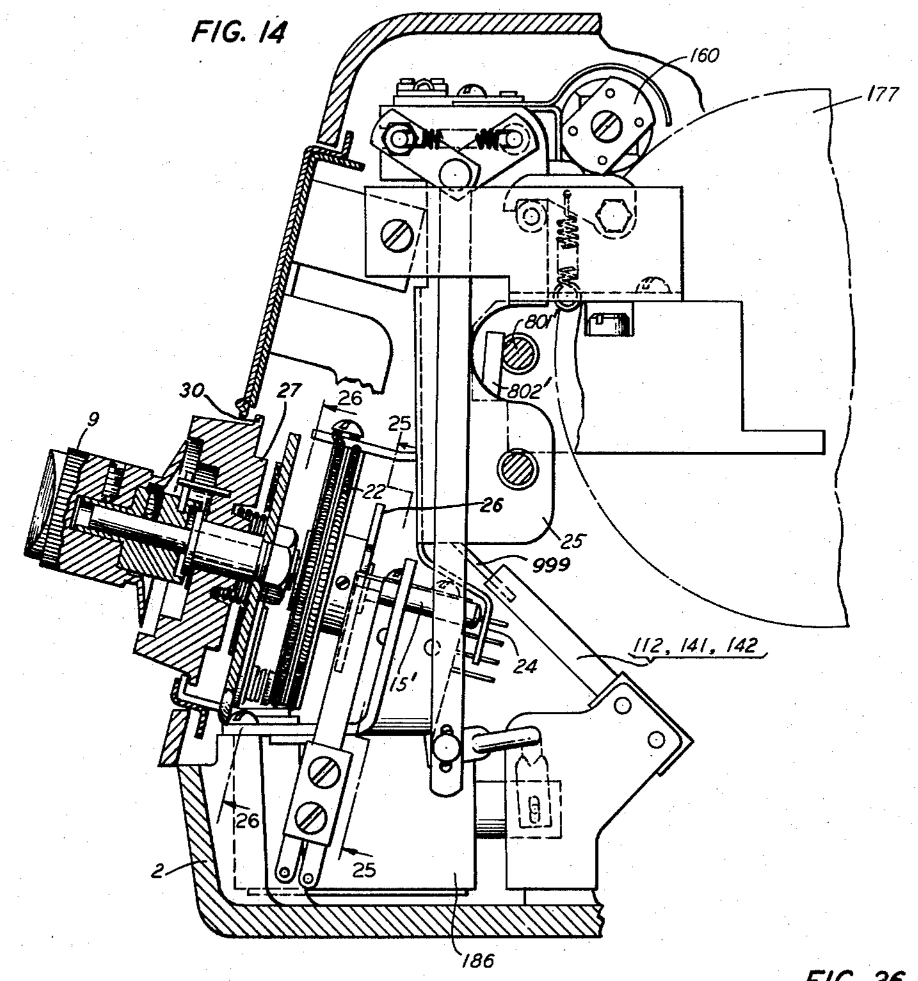
Fig. 14 is another transverse section of the operating mechanism.
Figure 25:
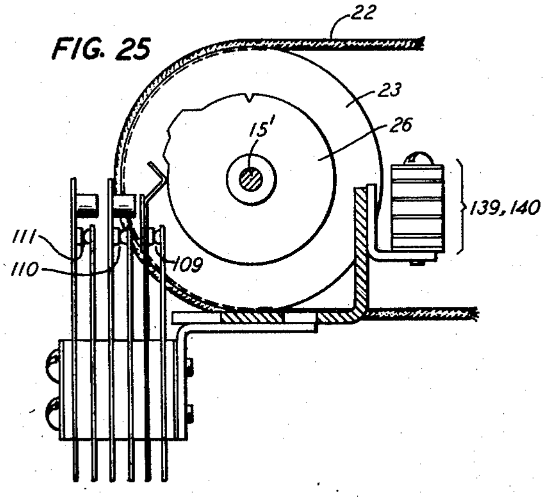
Fig. 25 is a section taken along the line 25—25 of Fig. 14, looking in the direction of the arrows.
Figure 26:
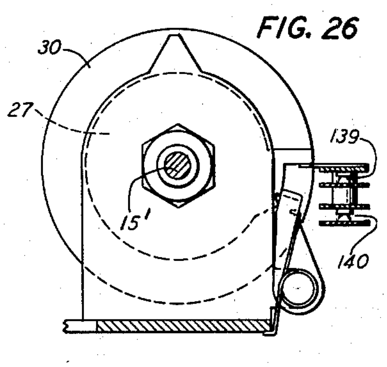
Fig. 26 is a section taken along the line 26—26 of Fig. 14, looking in the direction of the arrows.
Figure 15:
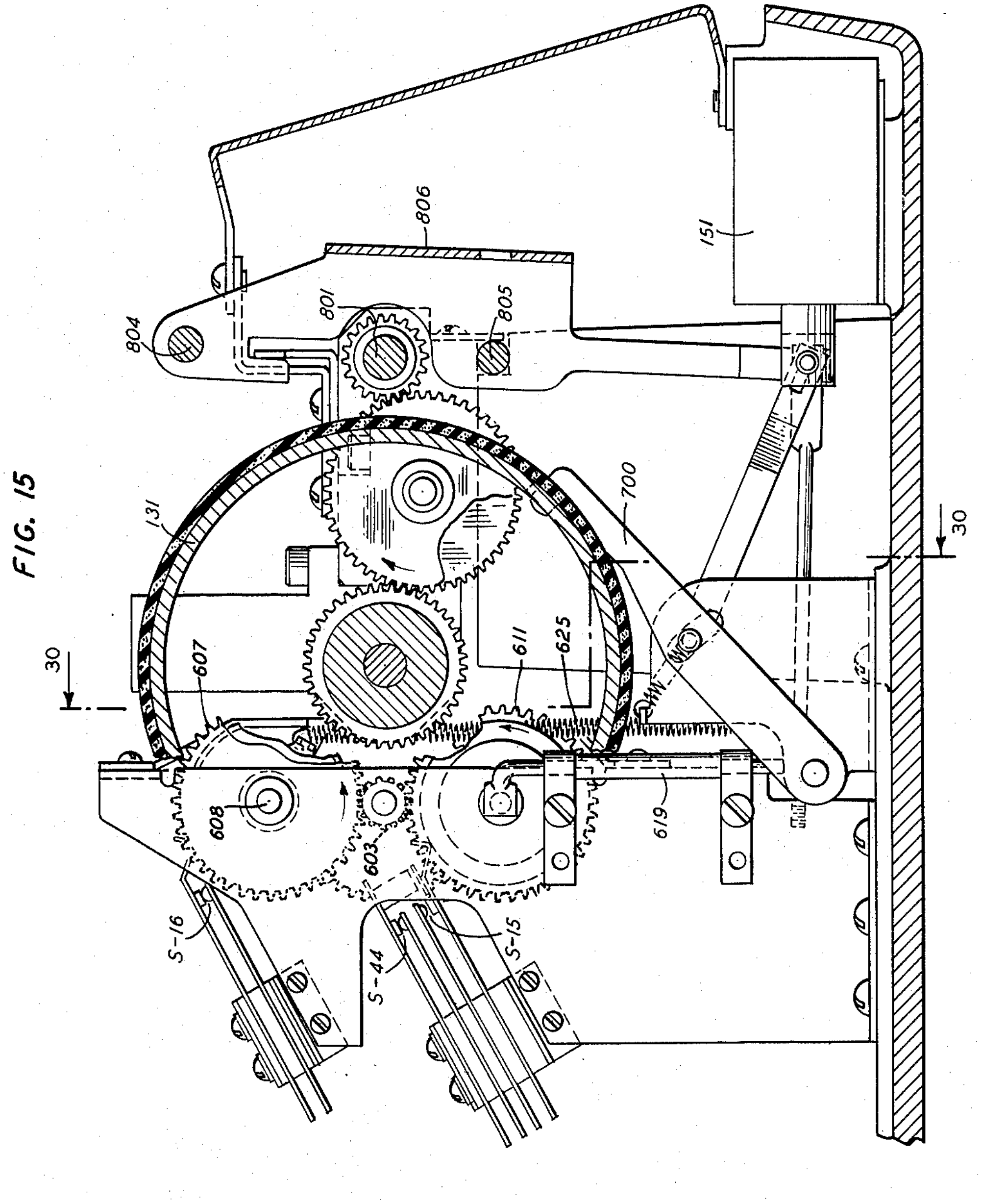
Fig. 15 is a section taken along the line 15—15 of Fig. 11, looking in the direction of the small arrows.
Figure 16:
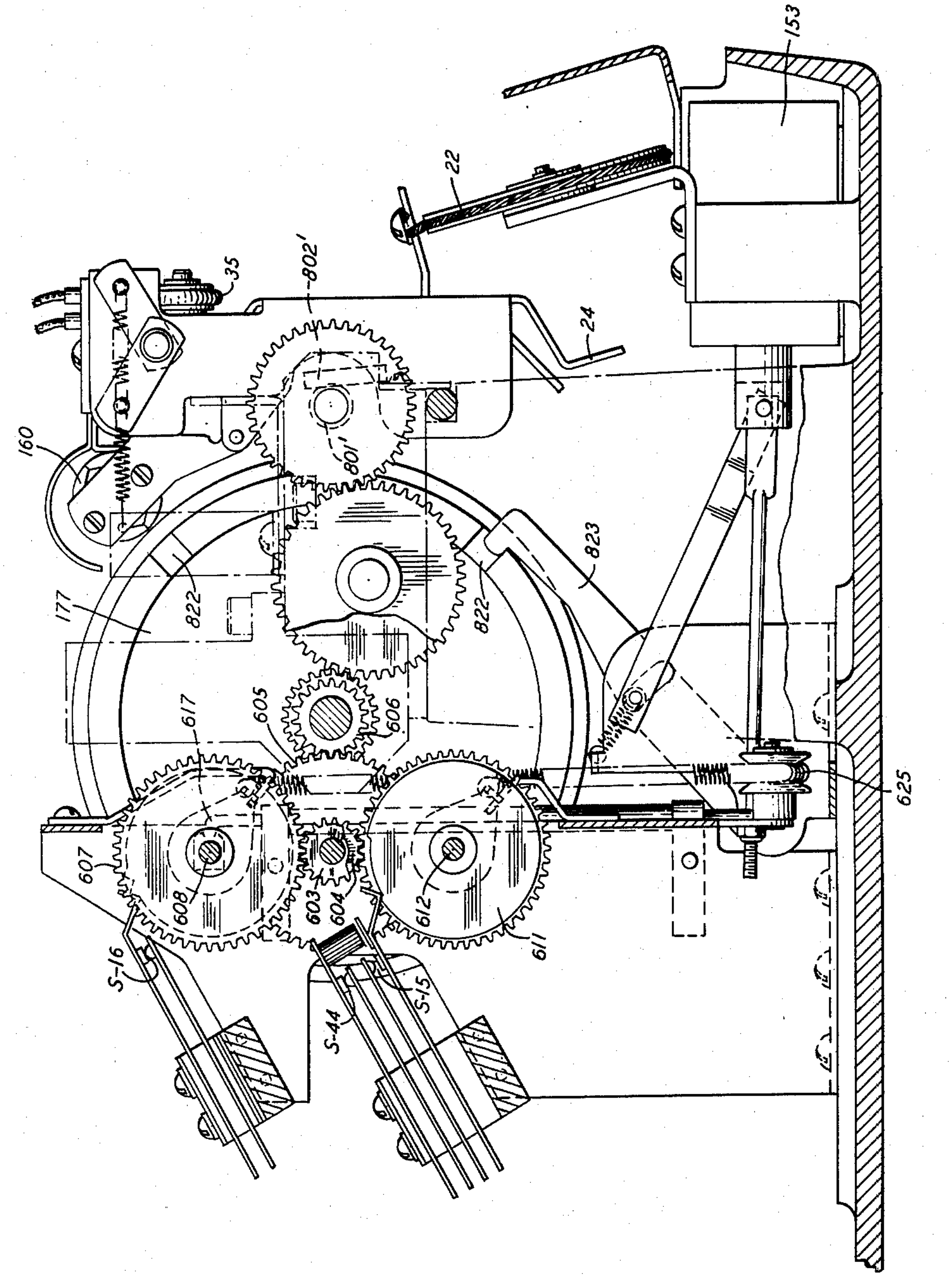
Fig. 16 is a section taken along the line 16—16 of Fig. 11, looking in the direction of the small arrows.
Figure 20:
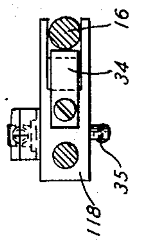
Fig. 20 is a section taken along the line 20—20 of Fig. 17, looking in the direction of the arrows.
Figure 19:
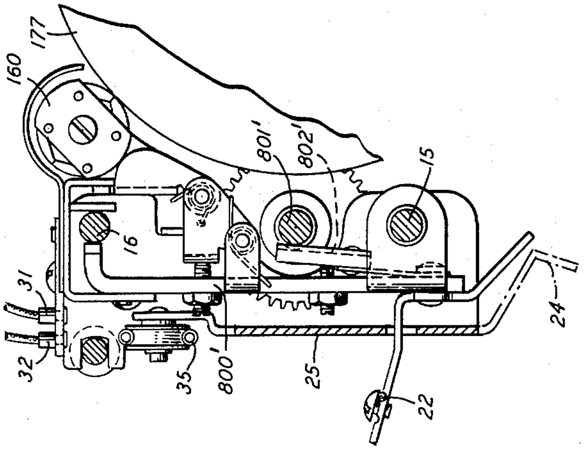
Fig. 19 is a section taken along the line 19—19 of Fig. 17, looking in the direction of the arrows.
Figure 18:
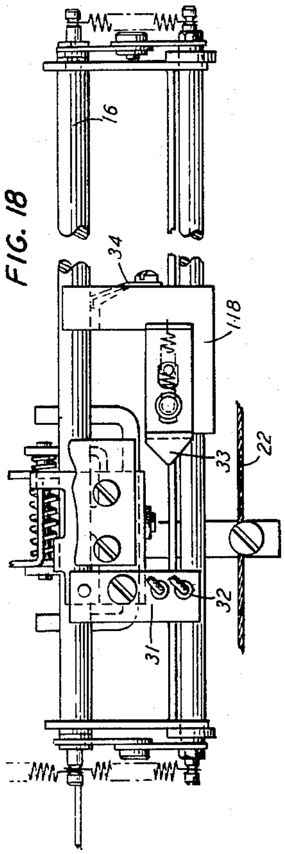
Fig. 18 is a view looking down on Fig. 17.
Figure 17:
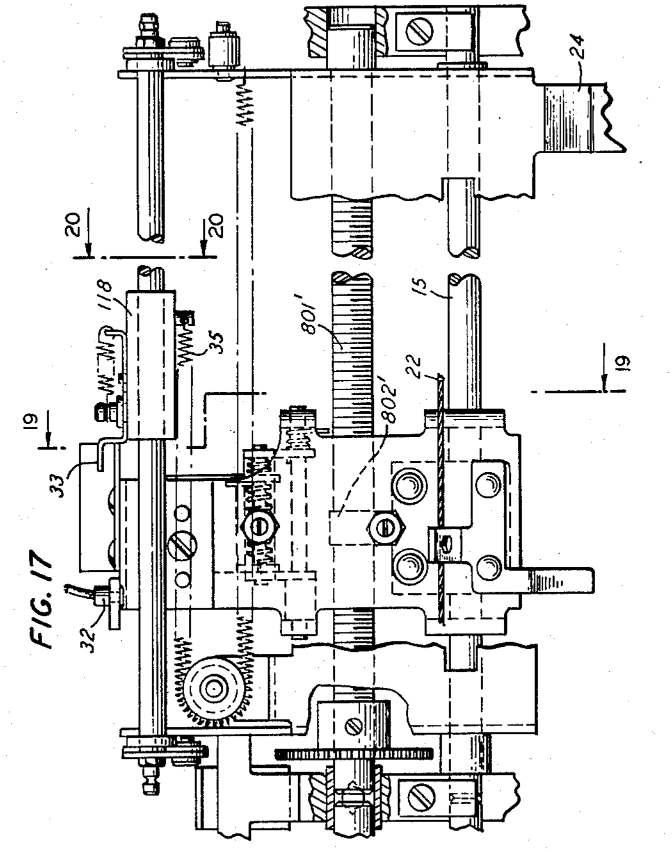
Fig. 17 is a front view of a section of the interior mechanism showing particularly the talk-in carriage and its associated apparatus.
Figure 22:
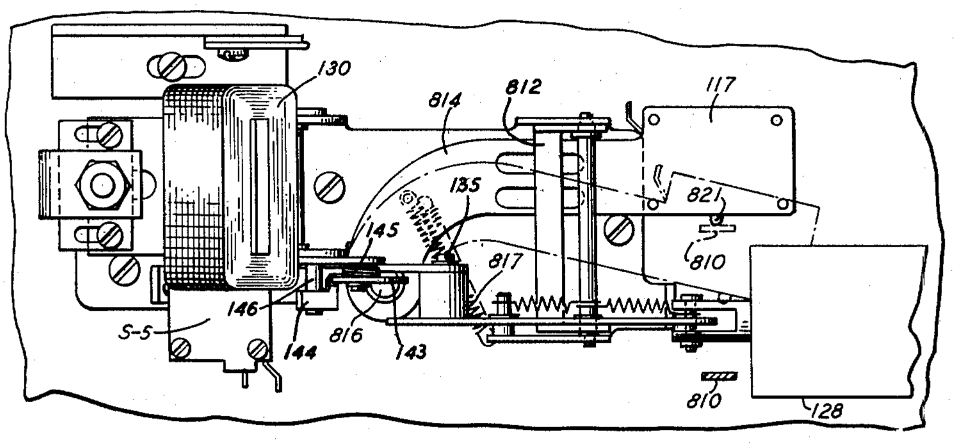
Fig. 22 is a view looking down on Fig. 21.

The record-reproduce heads 803 and 160 are mounted on carriages 800 and 800′, respectively, the former of which appears in Fig. 13 and the latter of which is shown in Fig. 17. The carriage 800 is adapted to slide laterally on horizontal guide rods 804 and 805 while the carriage 800′ is adapted to slide similarly on slide rods 15 and 16 (Fig. 19).

The carriage 800 is moved by a "half-nut" 802 which engages a lead screw 801 driven by gears from the drum 131. Similarly, the carriage 800′ is moved by a "half-nut" 802′ which engages a lead screw 801′ driven by gears from the drum 177.

The smaller drum 131 is used for recording and reproducing the announcement, or outgoing message and comprises an aluminum drum covered by a synthetic rubber band or tire containing magnetic iron oxide. Recording on this drum is accomplished by applying audio current and high frequency bias current to the magnetic recording head 803 which is held in contact with the band during recording. As the drum rotates it turns the lead screw 801 causing the carriage 800 to move across the width of the band, tracing a helical track with 0.10 inch spacing between track centers. The drum rotates once in about three seconds so that a message of thirty seconds duration requires ten revolutions of the drum or a band width of one inch. The drum is stopped in a given "indexed" position when the solenoid-operated pawl 700 drops back into the single slot 701 on the drum surface.

The recording head 803 is mounted on a pivoted arm on carriage 800 with a small spiral spring 20 (Fig. 13) applying about twenty to twenty-five grams pressure between the head and the band. When the solenoid 151 is not operated, the pawl 700 stops rotation of the drum 131 and the half-nut 802 is disengaged from the lead screw 801 and the recording head is removed from contact with the magnetic band. When the solenoid 151 is energized, the bail 806 is rotated on the slide bar 805 as a pivot so that the pawl 700 is disengaged from the drum allowing the drum to rotate; the half-nut 802 is engaged with the lead screw 801 and the recording head 803 is allowed to come in contact with the magnetic band.

As the announcement head 803 moves from its zero position, a cord 808 (Fig. 11) attached to a lug 809 on the bail 806 rotates a pulley 807 which winds up a spiral spring. When the half-nut 802 is disengaged from the lead screw 801, this spring pulls the carriage back to its zero position. By causing the drum to always stop in the same position, the record-reproduce head always retraces the same track on the magnetic band.

As stated hereinbefore the drum 131 is stopped in a given indexed position by providing the single slot 701 into which the pawl 700 can rest. A switch 119 (Fig. 24), which is held closed until the pawl 700 is seated, provides a circuit to keep the motor running until the drum stops in its home position.

Provision is made for recording and reproducing outgoing messages of any length from twelve to twenty seconds without "dead" time between the end of this message and the beginning of the incoming message on drum 177. This is accomplished by means of an adjustable limit switch which, in the recording operation, is automatically positioned at a point corresponding to the end of the travel of the announcement carriage 800. This mechanism is shown particularly in Figs. 21 and 22. A pivoted arm 814 carries a microswitch 117 which is operated by the arm 810 which is secured to and moves with the carriage 800. A friction pad 820 is arranged to normally press against the arm 814 and thus hold the switch 117 in a fixed position. When the machine is running in the "Announcement Dictate" condition, that is, when the subscriber is recording an outgoing message or announcement on the drum 131, the solenoid 128 releases the friction pad 820 carried by the bail 812 which is pivoted at 813, thus freeing the switch-bearing arm 814 to move to a new position under the action of arm 810 which is fixed to the carriage 800. A spring 817 pulls the switch arm 814 toward the zero position so that the first effect of the release of the friction pad is for the switch arm to return to a stop near the zero position. When the carriage reaches this position the arm 810 pushes against the switch-operating pin 821 moving the arm 814 and switch 117 without operating the switch contacts. When the subscriber has finished dictating the outgoing message he presses a "stop" button 205 causing the solenoid 128 to release and allowing the friction pad to again press against the arm 814. This holds the arm and switch in this position for all subsequent operations and until a new announcement is recorded. Consequently, when the outgoing message is reproduced, the carriage 800 moves laterally to the right to the end of the message when the carriage arm 814 operates the contacts of switch 117 causing the deenergization of solenoid 151 and permitting the carriage to return to zero position under the action of the spring carried by pulley 807 (Fig. 13). Operation of switch 117 also starts the incoming message drum 177 rotating and performs other switching functions to be described in detail hereinafter.

When a new outgoing message is to be recorded it is necessary that the previously recorded message be erased. This is accomplished by means of an iron core coil 130 (Figs. 13 and 32) which is energized by 60-cycle current and held near the drum 131 for one revolution thereof. The core has a face approximately the length of the recording area on the drum so that the entire helical track is erased in one revolution of the drum. The erase coil 130 is mounted on a pivoted arm 137 with stops 175 and 176 so positioned that the core comes within 0.020 inch of the magnetic band of drum 131 when erasing and is about 0.4 inch from the band when not in use. This latter distance prevents residual magnetism of the band when the erasing current is interrupted by the operation of contacts 115*a* of switch S5 just before the coil 130 is moved to its rest position. The erase coil is moved to its operating position by the same solenoid 128 which releases the arm 814 holding the adjustable limit switch 117. However, since the switch 117 must be released during the entire time in which the outgoing message is being recorded and the erase coil is to be operated for only one revolution, the latter is mechanically released by a pin 148 carried by the drum 131. This pin, after one revolution engages a lever 144 which causes the release of the erase coil 130 although solenoid 128 remains energized. The pin 148 is fixed to the drum in such a position that it does not engage the release lever 144 after the first revolution of the drum. Further reference to the operation of this mechanism is contained in a later description.

Figure 10:
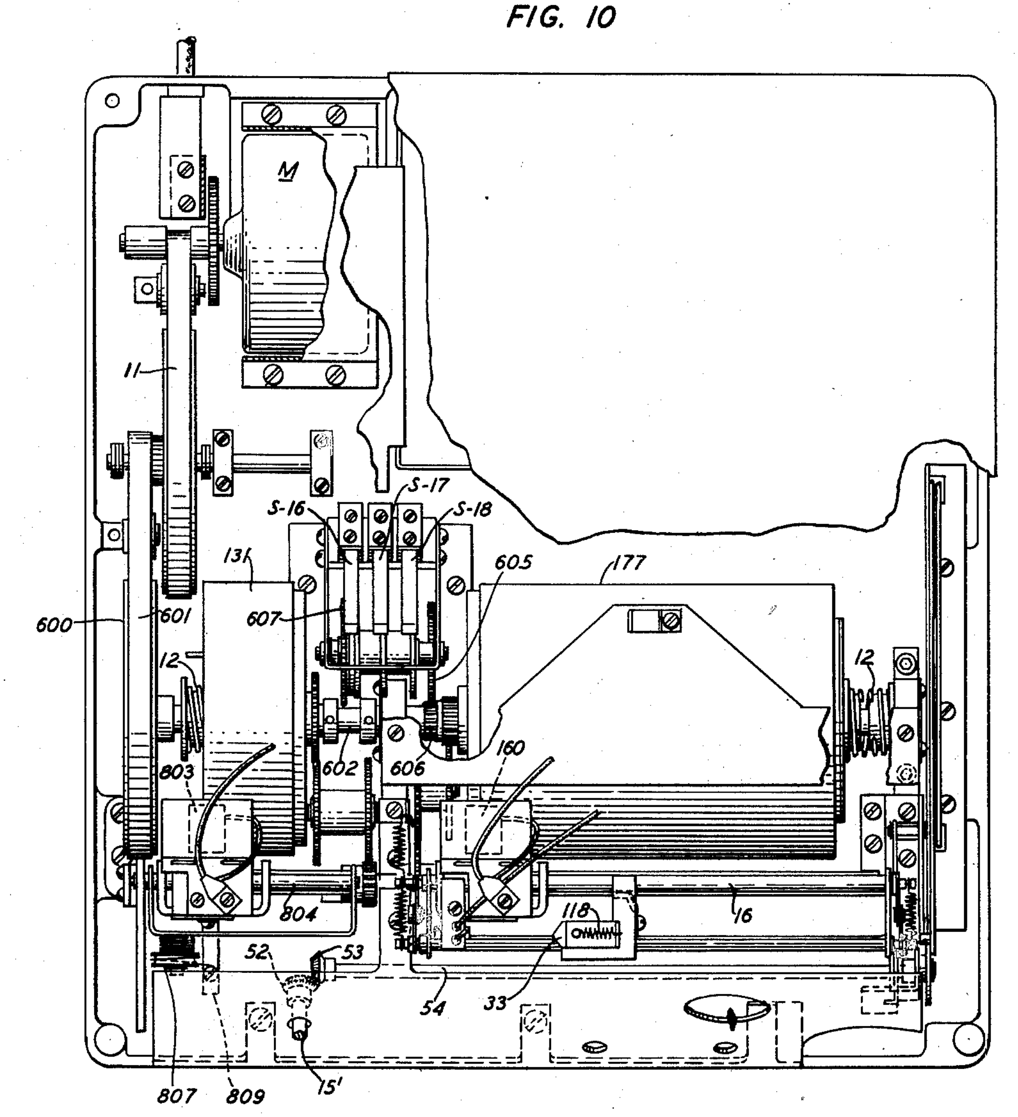
Fig. 10 is a top plan view of the device with the cover partially broken away.
Figure 11:
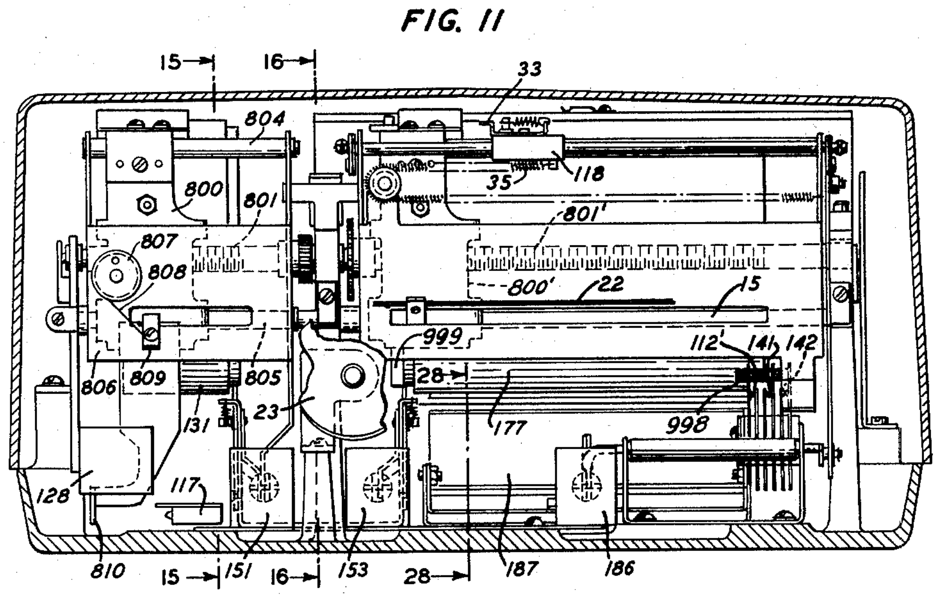
Fig. 11 is a view of the device from the front with the interior mechanism exposed.
Figure 12:
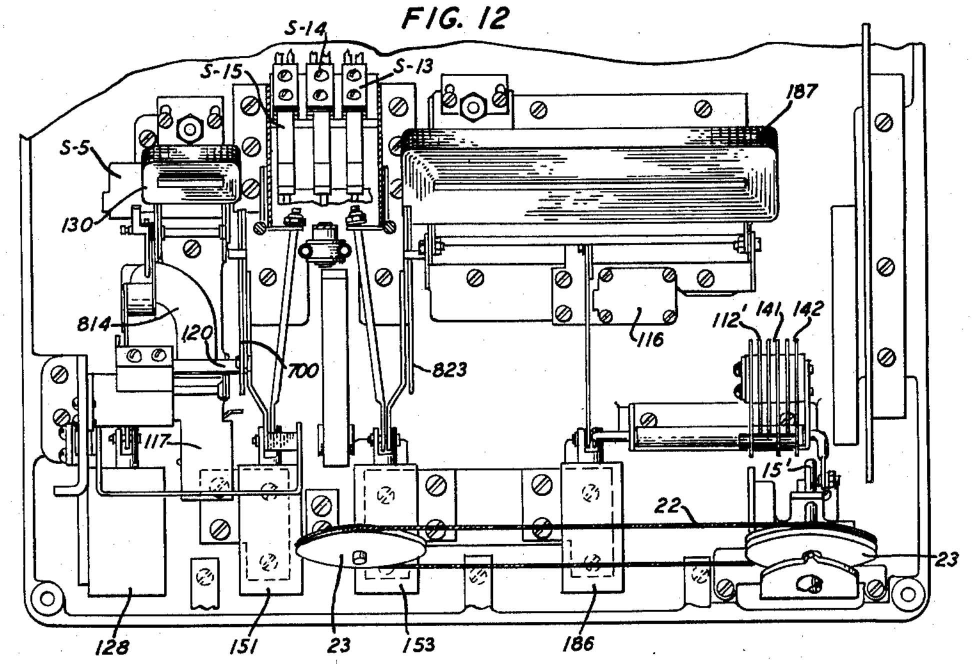
Fig. 12 is a top plan view of the interior mechanism with some of the apparatus removed for purposes of clarity.

The large message drum 177, on which incoming messages are recorded, also is driven by the motor M through a continuously rotating clutch 12 similar to that used on the announcement drum 131 but located at the opposite end of shaft 10 as shown in Fig. 10. Rotation of the drum 177 is controlled by solenoid 153 and pawl 823. On this drum (Fig. 16) there are four slots 822 which the pawl 823 can engage to arrest the drum since it is not necessary to always stop it in the same position. As the drum 177 rotates, it turns the lead screw 801′ through a gear reduction, giving a track spacing of 0.025 inch, center-to-center. The message record-reproduce head 160 is mounted on the carriage 800′ with half-nut 802′ engaging the lead screw 801′. There is no provision for automatic return of the carriage 800′. Instead, the carriage 800′ is connected by means of a flexible cable 22 (Figs. 12 and 17) and pulleys 23 to a message scanning knob 9 which rotates as the carriage is moved by the lead screw and shows the position of the head 160. When playing back messages this knob 9 is used for manually moving the head 160 to any desired part of the drum 177 to pick out any message or to repeat a message. Before this can be done it is necessary to disengage the half-nut 802' from the lead screw 801', which is accomplished by pushing in on the knob 9. By so doing, the shaft 15 is caused to engage the arm 24 on the bail 25 on which the carriage 800' is mounted thereby moving the bail on the pivot 15 enough to disengage the half-nut 802' from the lead screw 801', but the motion of the shaft is not enough to affect the cable 22 running on the pulleys.

A cam 26 (Fig. 25) is mounted on the scanning knob shaft for operating switches 109, 110 and 111 in sequence and for purposes hereinafter to be described. Another cam 27 on the same shaft 25 but connected to the indicator dial 30 operates switches 139 and 140 for purposes also to be described hereinafter.

The message drum 177 is also equipped with a switch 118 (Figs. 10, 17, 18 and 19) which prevents recording over a portion of the drum already used but not erased. This switch consists of two parts, the fixed contacts 31, 32 located on an insulator attached to the head carriage 800' and a shorting contact 33 mounted on the switch carriage 118. This carriage has a locking spring 34 normally pressed against the movable slide bar 16 with sufficient friction to hold it in position but not enough to keep the head carriage from pushing it ahead during the recording of messages. The spring 34 is so shaped that the friction opposing motion to the right is much less than that opposing motion to the left. When the machine is set for "Automatic Answer" with the head 160 at the beginning of the travel of the carriage 801' the switch is released before the first message is recorded. When released it is pulled to zero position by means of a coil spring 35 and causes the contact 33 to engage contacts 31, 32 thus effectively closing the circuit controlled by the latter. These contacts remain engaged during recording of incoming messages but are disengaged when the carriage is moved manually for message-scanning purposes.

The indicator dial 30 is provided to show the maximum extent of recording on the message drum. This is useful in case a relatively small proportion of the drum is used and the subscriber wishes to set the machine for recording additional messages without erasing those already recorded although he may have played back one or more of the messages on the drum. The indicator dial is mounted between the cabinet panel and the message scanning knob 9 and is rotated by the scanning knob during recording. However, it remains in position when the scanning knob is turned for playing back messages and must be manually reset to zero before incoming messages can be erased.

Connected to the indicator dial, as stated before, is the cam 27 which controls the switches 139 and 140 which, in turn, control mechanism for erasing incoming messages, as will be further described hereinafter.

Figure 28:
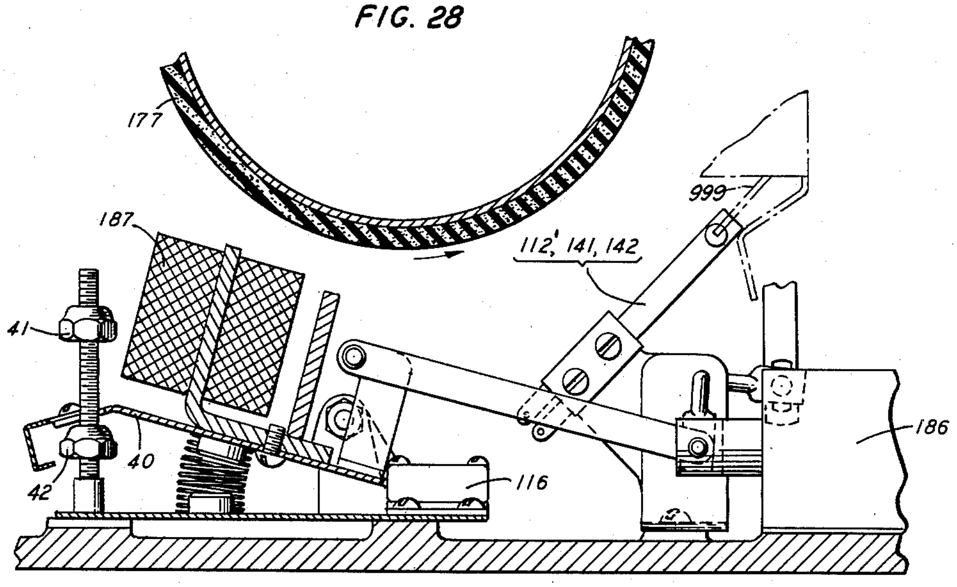
Fig. 28 is a sectional view of the erase coil of the talk-in component and its controlling mechanism taken along the line 28—28 of Fig. 11.
Figure 29:
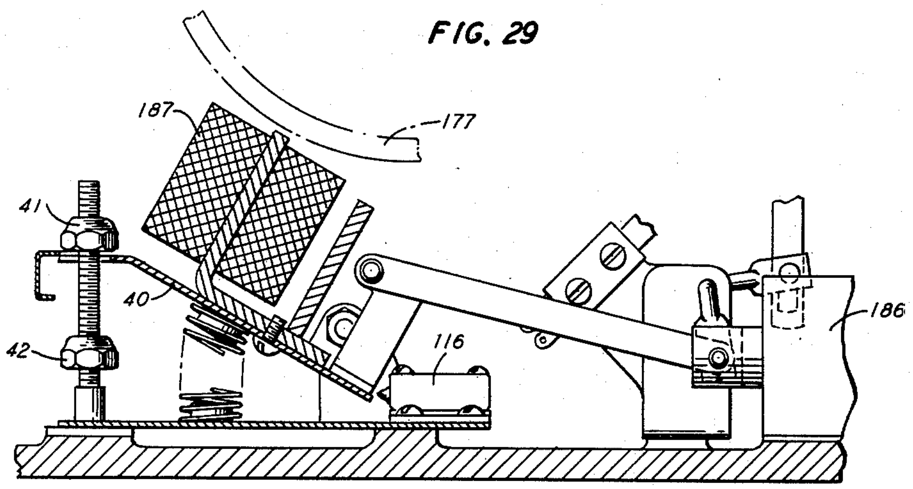
Fig. 29 shows the erase coil of the talk-in component in its operated position.
Figure 31:
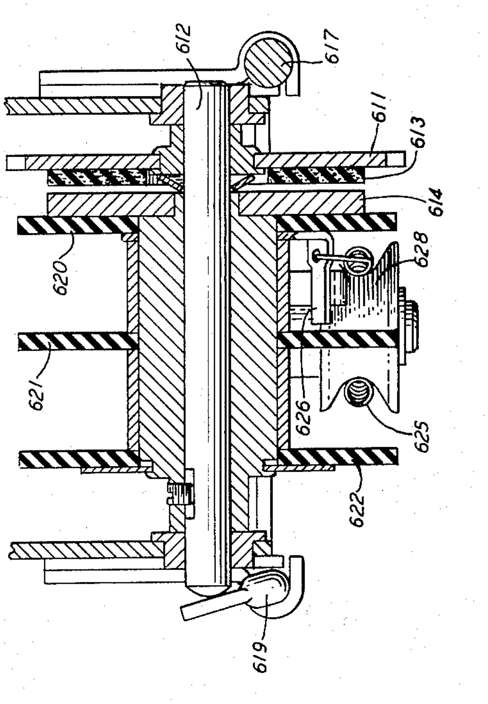
Fig. 31 is a section taken along the line 31—31 of Fig. 30, looking in the direction of the arrows.
Figure 32:
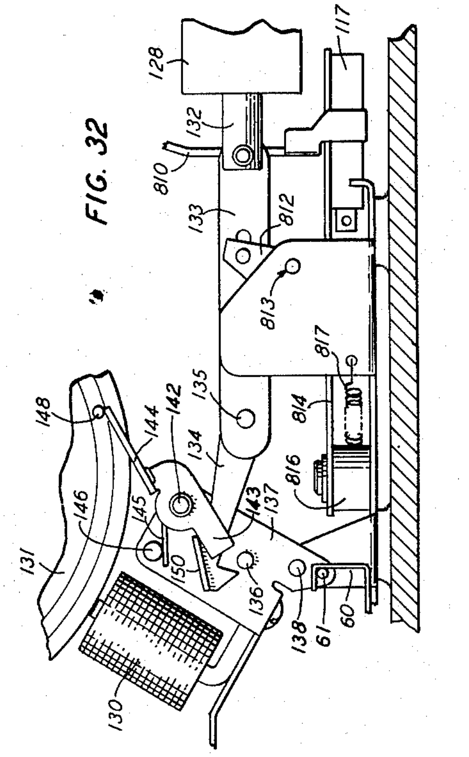
Fig. 32 is a view of the erase coil of the talk-out component in its operated position at instant of release.

Erasing the incoming messages is accomplished by means of 60-cycle current in a manner similar to that used for the announcement drum 131. The erase coil core is approximately the length of the recording area and is mounted on a pivoted support 40. It is operated by solenoid 186 as shown in Figs. 28 and 29 and as more fully described in the aforenoted Keith-Nickerson application. The current to the coil 187 is controlled by switch 116 which, in turn, is controlled by the movement of the coil. At 41 and 42 are shown adjustable stops for adjusting the normal and operated positions of the coil 187.

Since the message drum 177 is not always stopped at the same angular position, it is not feasible to have the erase cycle timed directly by the drum. The timing is done by cam 622 and relay 245 as hereinafter described, releasing relay 422 and solenoid 186 after slightly more than one revolution of the drum.

Figure 3:
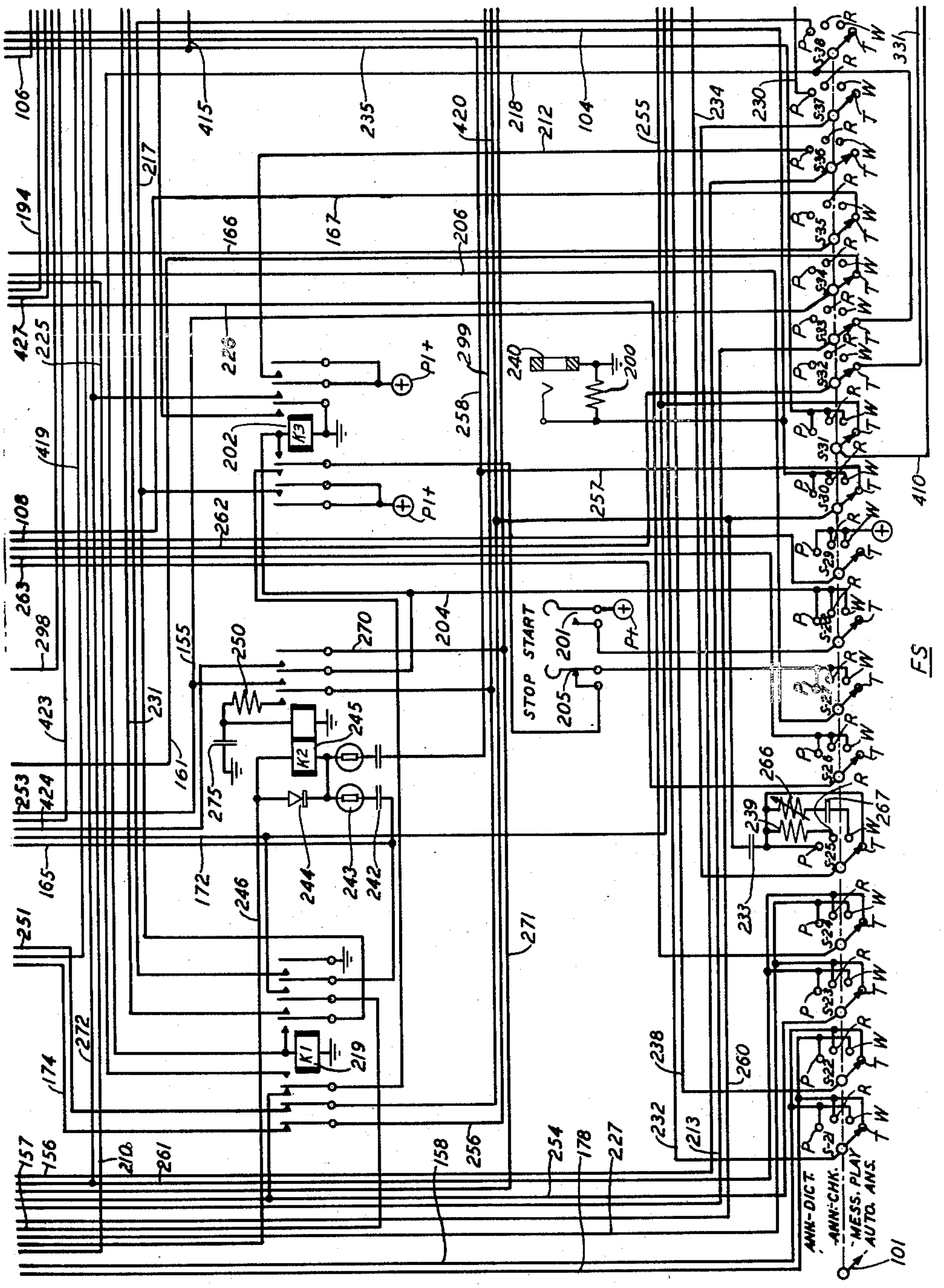
Figure 4:
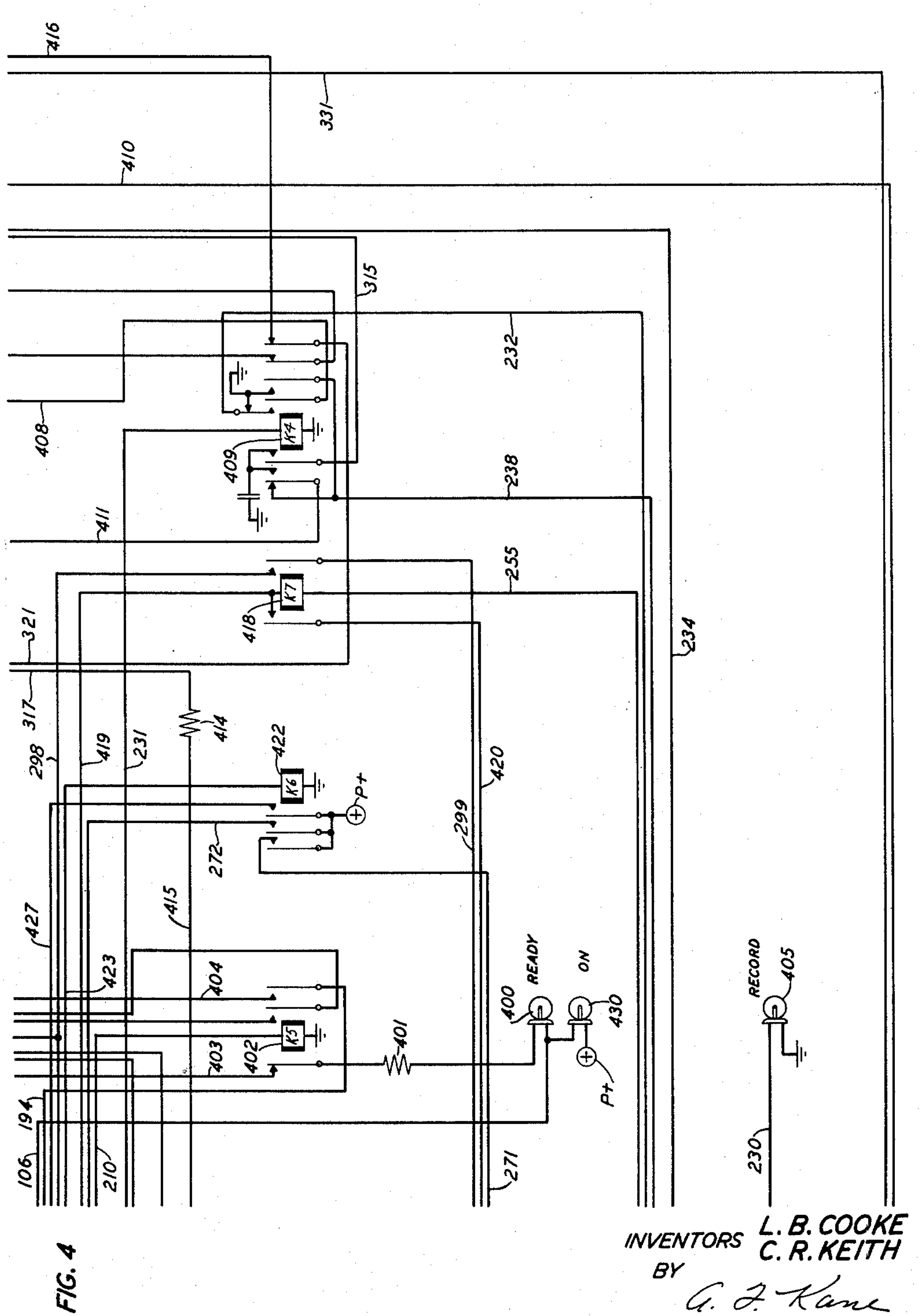

Switches 112', 141 and 142 (Figs. 11, 12) are provided for operating an external recorder shown schematically at R2 in Fig. 3 and are located beyond the end of the normal travel of the incoming message head carriage in a position such that the switch member 998 is engaged by the tail 999 (Fig. 11) on carriage 800' causing the switches to be actuated. The manner in which these switches are operated is described in the above identified Keith-Nickerson patent.

A single speech amplifier AMP (Fig. 3) is used for recording and reproducing both incoming and outgoing messages. Associated with the speech amplifier are an automatic colume control amplifier, a recording bias oscillator and a beep tone amplifier.

The speech amplifier consists of the tubes V1, V2 and V3 all having direct heated filaments operated on filtered direct current from the 75-volt power supply. Speech input voltage is applied directly to the grid of tube V1, with resistance-capacitance coupling to tube V2. A potentiometer 196 is mounted on the amplifier chassis so as to be inaccessible to the subscriber. It is intended only to compensate for accumulated variations in vacuum tubes and other circuit components. Resistors 197 and 308 are connected across the filaments of tubes V1 and V2, respectively, since these tubes are such as to require less filament current than the other tubes. Resistors 198 and 199 form a voltage divider to supply screen voltage to tube V1, providing a small amount of degenerative feedback. Resistor 306 provides grid bias for tube V3. Feedback is provided around tube V3 by means of resistance 192 and condenser 193.

Output transformer T1 is used for connecting the speech amplifier to the isolating transformer T2 for transmission to the telephone line. It is also used for the speech connection to the external recorder R2 when provided. When recording, the audio output from tube V3 is combined with the high frequency bias from the bias oscillator V5 and connected to either of the recording heads 160 or 803, as will be fully described hereinafter.

The bias oscillator V5 is designed to operate at a frequency of about 13,000 cycles per second. When the speech amplifier is used for reproducing sound from either magnetic record 131 or 177, the filaments of tubes V4 and V5 are shunted by the resistor 310 to reduce the filament current in these tubes to about one-third of normal and to eliminate high frequency bias and automatic volume control while reproducing either the announcement or incoming messages.

Automatic volume control is used during recording of both the announcement and incoming messages. Speech voltage is taken from the plate of tube V2 to the grid of tube V4 by way of condenser 189. Frequencies above 1 kilocycle are removed by condenser 330, the remainder being rectified by X-3 and filtered by resistance 331 and condenser 332. The automatic volume control circuit is disabled during transmission of beep tone (while recording incoming messages) by means of cam 631 which energizes the beep amplifier V6 as will be described in detail hereinafter.

Signal or beep tones are obtained from a tone generator mounted on the driving motor M; this generator is indicated by the coil 181 shown in Fig. 1. The comparatively low level from this generator is amplified by V6 before transmission to the line. Transformer T2 serves as an output transformer for V6 as well as an isolation transformer. The beep tone level is controlled by resistors 182 and 183. The level of the first three beeps, two at the beginning of the incoming message and the first of two final warning tones, is set by the voltage divider 182—183 to give a level of about −10 decibels (as referred to one milliwatt) on the line. The cam 630 (Fig. 1) operates at the same time as the last lobe on cam 631 to increase the level of the last beep.

Direct current for the amplifier, relays, solenoids and lamps is obtained from rectifiers X1 and X2 which are connected to separate windings of power transformer T4. The voltage supply to the relays is on continuously, as long as switch 100 is turned to the On position, in order that the relays and signal lamps may be immediately available for use. Current to the signal lamps, solenoids and to relays 202 and 422 is filtered by condenser 333 only. However, to reduce hum pick-up in various circuits, current to relay 245 is filtered by resistance 250 and condenser 275 and current to relays 219, 409 and 402 is filtered by resistance 301 and condenser 335. Current for operating relay 418 is obtained from the central office battery 175.

Rectifier X2 supplies 75-volt direct current for amplifier AMP only when the machine is in operation, that is, when relay 402 is operated, as will be described later. Suitable filtering is provided for the vacuum tube filaments and plate circuits in well-known manner.

Figure 2:
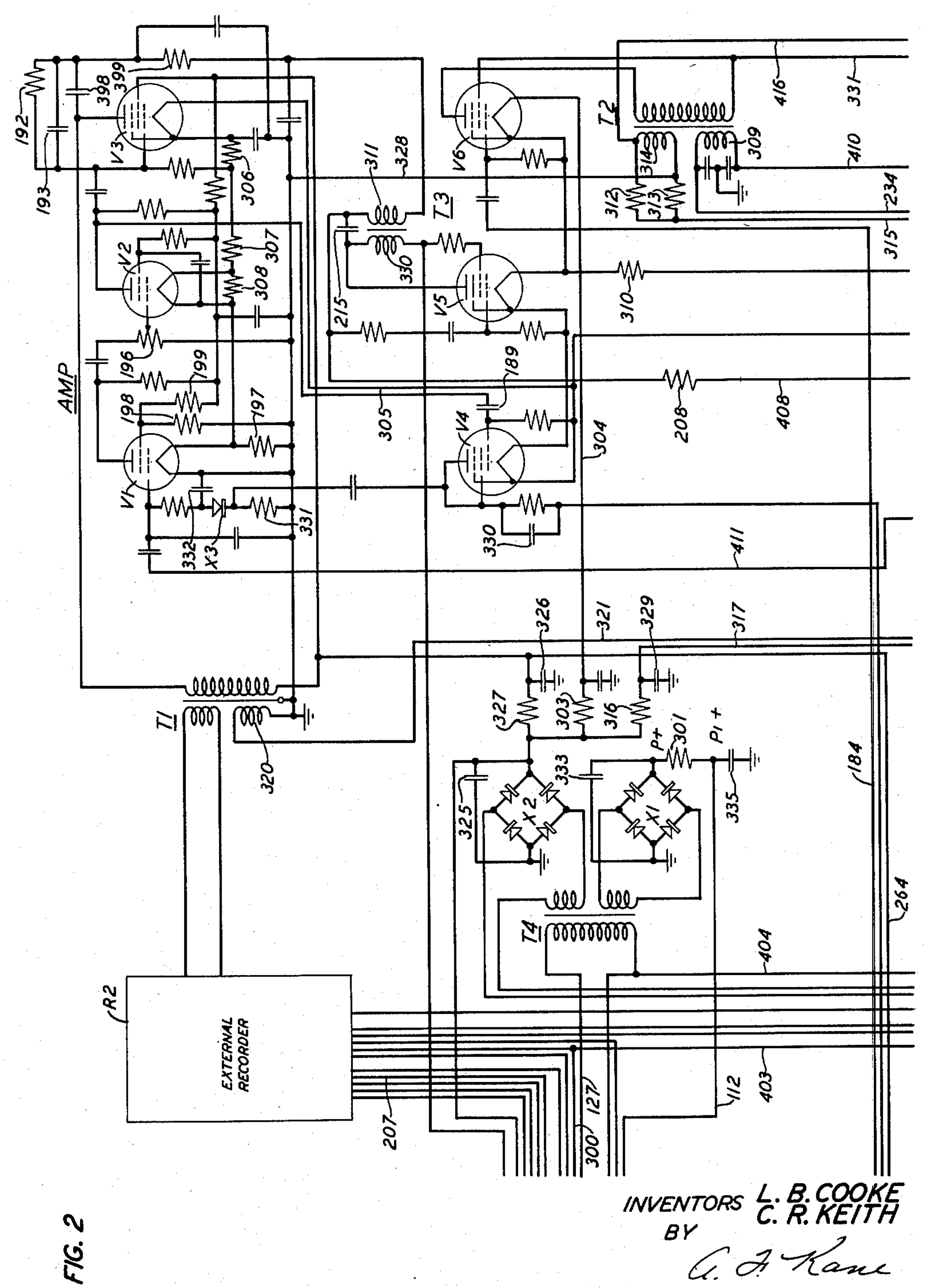

A function switch FS is shown schematically at the bottom of Fig. 2; it comprises eighteen subswitches which are simultaneously turned to one of four different positions to effect various circuit controls. The switch FS is manually set by a knob 4 with which is associated a pointer 101 which may be set to any of four different legends defining the functions performed by the telephone answering and message recording device.

Figure 27:
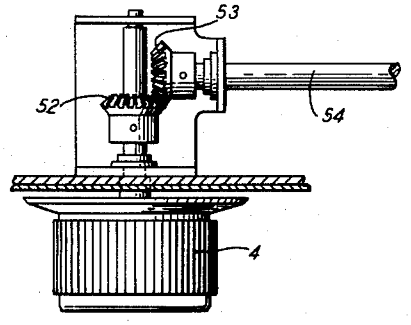
Fig. 27 is a fragmentary detail showing the function switch and the shaft controlled thereby; it is a section taken along the line 27—27 of Fig. 7, looking in the direction of the arrows.
Figure 33:
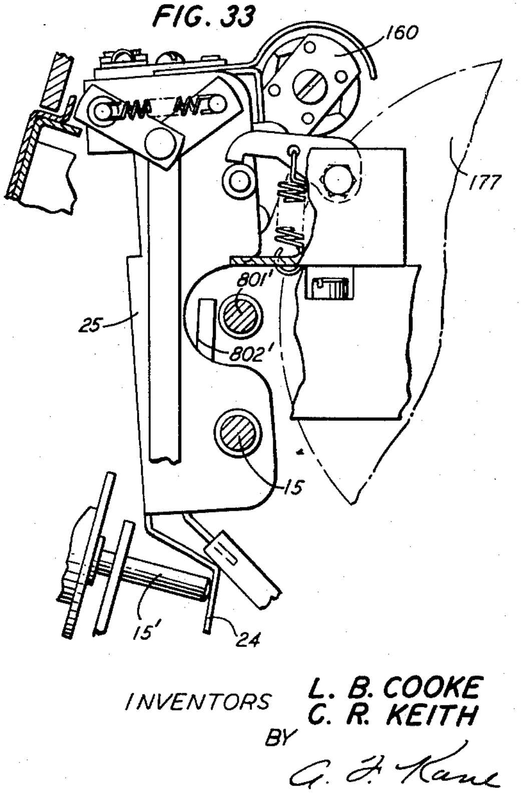
Fig. 33 is a view of the mechanism for disengaging the head associated with the talk-out drum under control of the scanning knob.
Figure 8:
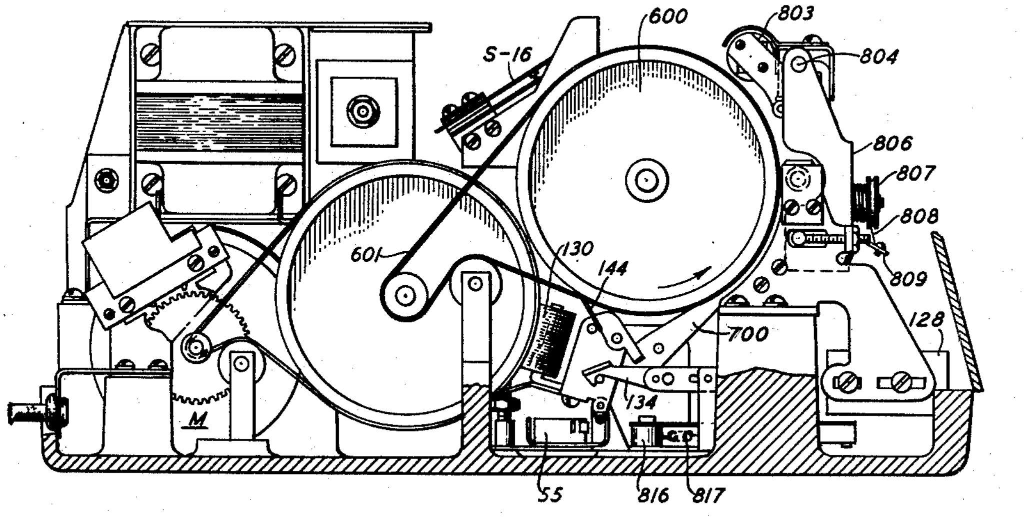
Figs. 8 and 9 are left and right end views, respectively, of the device with the cover partially removed or broken away to disclose the apparatus within.
Figure 9:
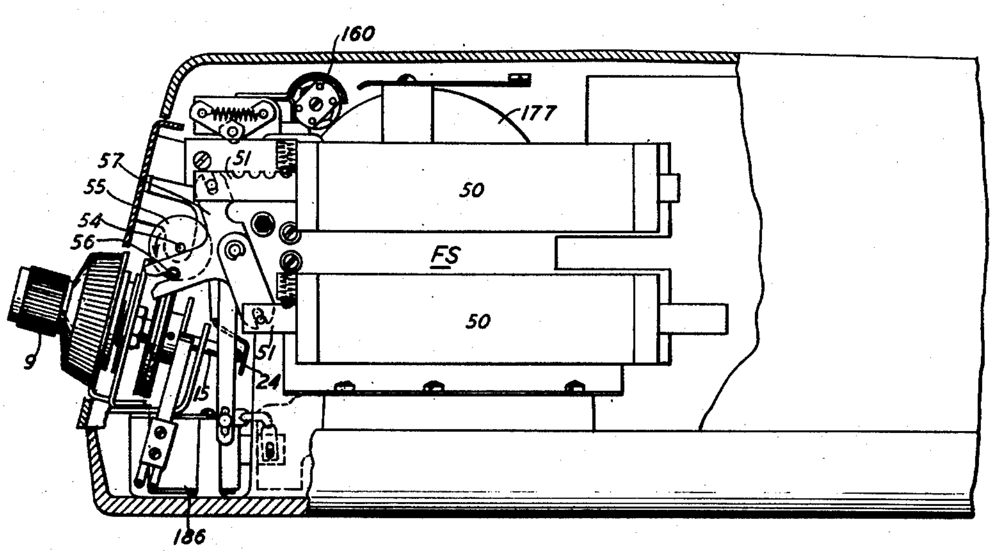

The function switch FS of Fig. 2 is shown structurally in Fig. 9. Actually, the switching is accomplished by two slide switches indicated at 50 each of which includes a flat bar 51 which are adapted to move reciprocally under the control of the knob 4 (Fig. 27). A bevel gear 52 on the knob shaft engages a similar bevel gear 53 on a rod 54 extending to the right side of the machine behind the front panel. On this rod is a plate 55 carrying a pin 56 which engages with a pivoted T-shaped arm 57 in a manner to push the slider or bar 51 of one switch in and the other slider out. The bars engage spring contact clips to make or break circuits as required. In Fig. 2 this switching mechanism has been shown in schematic form for purposes of clarity of description.

*Control circuit*

The operation of the control circuits will be best understood from the following detailed description which is made with particular reference to Figs. 1, 2, 3 and 4. This description is made under five subheadings: (1) Announcement-Dictate, (2) Check Announcement, (3) Automatic Answer, (4) Message Playback, and (5) Incoming Message Drum Erasure.

*Announcement-dictate*

In order to record an announcement, or talk-out message on the recording medium of the talk-out drum 131, the "on-off" knob 7 of switch 100 is operated to its "on" position; the knob 4 of function switch FS is rotated manually until the pointer 101 is set on the legend "Announcement-Dictate"; and "start" switch 201 is momentarily operated.

The actuation of switch 100 to its "on" position causes the substation 102 to be disconnected from the telephone line L and to be connected across the conductors 235 and 104 by way of switch contacts *e* and *h*, the said conductors being associated with the telephone answering and message recording device located at the subscriber's station.

Lamp 400 (Fig. 4) is now lighted in a circuit extending from ground, over contact *b* of key 100, conductor 106, filament of lamp 400, resistance 401, left armature and back contact of relay 402, conductors 403 and 300, contact of switch 109, conductor 108, contacts P of switch unit S-29 of function switch FS, to positive battery at P+. The lighting of (ready) lamp 400 serves to notify the subscriber that the equipment is ready for use.

Lamp 430 also operates as an "on" signal in an obvious circuit which includes conductor 106.

Momentary operation of "start" switch 201 (Fig. 2) causes relay 202 to operate in a circuit extending from positive battery P+, over the closed contacts of switch 201, contacts P of switch unit S-28 of function switch FS, conductor 204, winding of relay 202, to ground.

Relay 202, operated, locks in a circuit which may be traced from ground, through the winding of relay 202, its front contact and innermost left armature, normal contacts of "stop" switch 205, contacts P of switch unit S-27 of function switch FS, conductor 206, contacts of switch 111, normal closed contacts 117*a* of the adjustable limit switch 117, conductor 112, resistance 301, rectifier X1 (Fig. 2), to ground.

Relay 402 now is operated in a circuit extending from positive battery P1+, the middle right armature and front contact of relay 202, conductor 210, winding of relay 402, to ground.

Relay 402, at its left armature and back contact opens the circuit to lamp 400 causing this lamp to be extinguished. At its outer right armature and front contact relay 402 completes the following circuit for motor M; from the lower terminal of the alternating-current source 121 (Fig. 1), over conductors 122 and 123, windings of motor M, conductor 194, outer right armature and front contact of relay 402, conductors 404 and 124, contact *a* of switch 100, conductor 125, contact of thermal switch 126, to the other terminal of source 121.

Motor M starts operating in this circuit and through pulley 600 and the associated belts 11 and 601 (Figs. 8 and 10) drives the common shaft 602 which carries, in fixed relation, gears 603, 604 and 605 (Fig. 16), the last meshing with gear 606 "fixed" to pulley 600.

The motor, as previously described, is coupled through friction clutch 12 to the recording drums 131 and 177 but, until these elements are released, in a manner fully described in the hereinbefore identified Keith-Nickerson application and briefly hereinafter, the clutch slips and the drums remain stationary.

Gear 603 meshes with gear 607 (Fig. 30) which is loosely mounted on cam shaft 608. To the right or inner face of gear 607 there is fixed a friction disc 609 of felt or any other suitable material. As will be more fully described hereinafter the disc 609 and a juxtaposed disc 610 fixed to shaft 608 comprise a friction clutch which serves to couple the cam shaft 608 and main shaft 602 incident to the energization of solenoid 153.

Similarly, gear 604 meshes with gear 611 which is loosely mounted on cam shaft 612. To the left, or inner face of gear 611 is fixed a friction disc 613 of felt or other suitable material which is engaged by the disc 614 incident to the energization of solenoid 151 as will be described in greater detail hereinafter. Disc 614 is fixed to the shaft 612.

Suffice it to say at this time that through the media of the friction clutches just described, the cam shafts 608 and 612 are caused to rotate under the influence of motor M when solenoids 153 and 151, respectively, are energized.

Relay 402, at its inner right armature and front contact, completes the power supply circuit to amplifier AMP (Fig. 3) by rendering the upper secondary coil of transformer T4 continuous, it being observed that the primary winding of this transformer is connected across the alternating-current source 121 by way of conductors 122 and 127 and the contacts of thermal switch 126, conductor 125, contacts *a* of switch 100, and conductors 124 and 404.

The supply current to the amplifier tubes traverses a path extending from ground, through rectifier X2, resistance 303, conductor 304, filaments of tubes V6, V5, V4, conductor 305, filament of tube V3, resistances 306 and 307, filament of tube V2 and its shunting resistance 308, filament of tube V1 and shunting resistance 197, to ground.

When relay 202 operated, as described, a circuit was completed extending from positive battery P1+, outermost left armature and front contact of relay 202, conductor 217, contacts P of switch unit S–38, conductor 218, winding of relay 219, to ground. Relay 219 operates in this circuit.

Clutch solenoid 151 associated with the announcement drum 131 now is operated in a circuit which is traced from positive battery P1+, over the middle left armature and front contact of relay 202, innermost left armature and front contact of relay 219, conductor 225, switch contact 141, conductor 226, contact P of switch unit S–24 of function switch FS, conductor 227, winding of solenoid 151, to ground.

Solenoid 151 performs three mechanical functions, the mechanism involved being shown in Figs. 6, 13, 15 and 30.

With particular reference to Fig. 13, it will be observed that solenoid 151 causes pawl 700 to be withdrawn from the slot 701 in drum 131 in which it is normally held by spring 702. Thus, the announcement drum 131 is freed for rotation under control of motor M.

Figure 6:
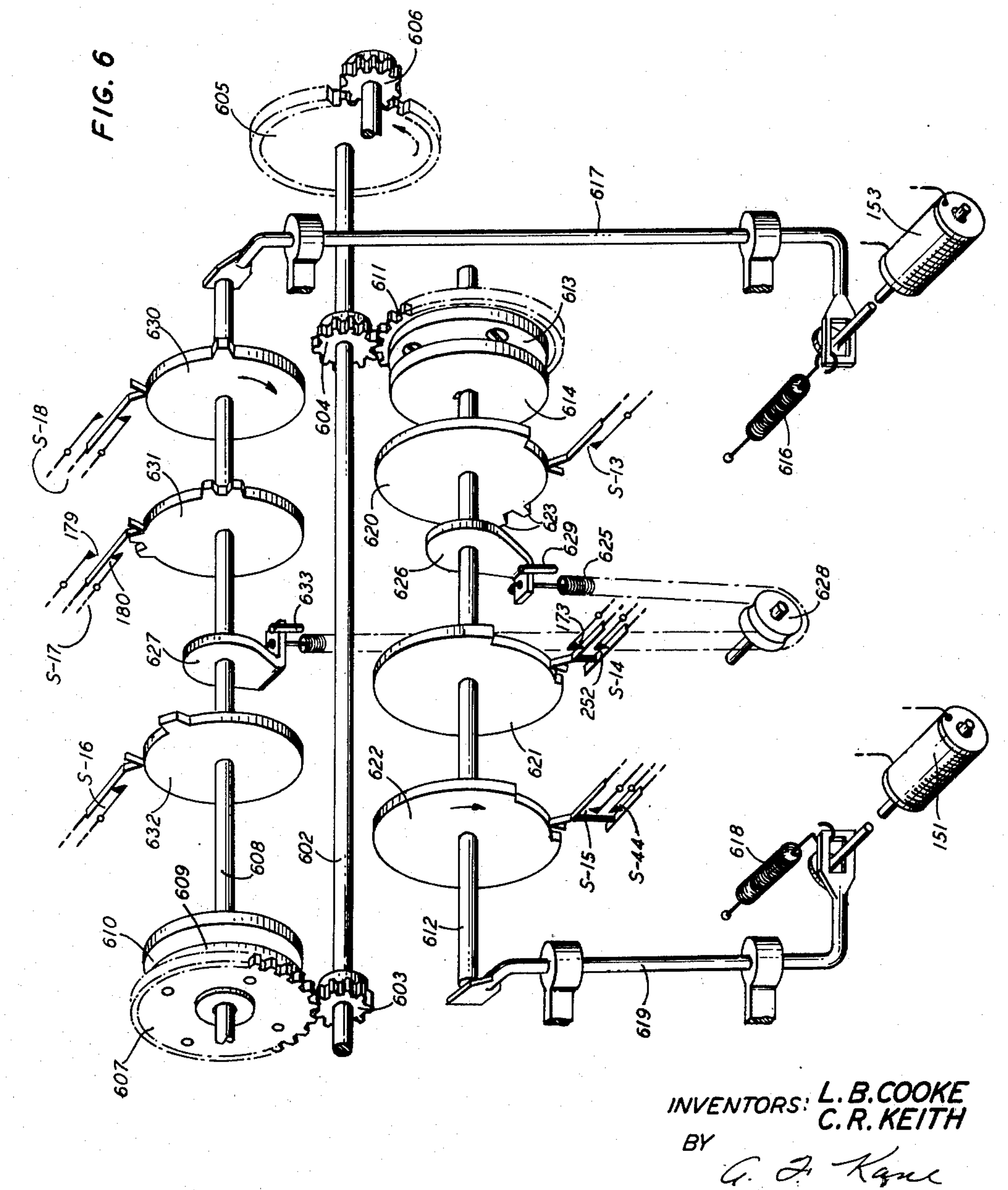
Fig. 6 is an enlarged schematic perspective view of a cam turret which embodies a plurality of cams used to operate various circuit controlling contacts of the control circuit of this invention.
Figure 7:
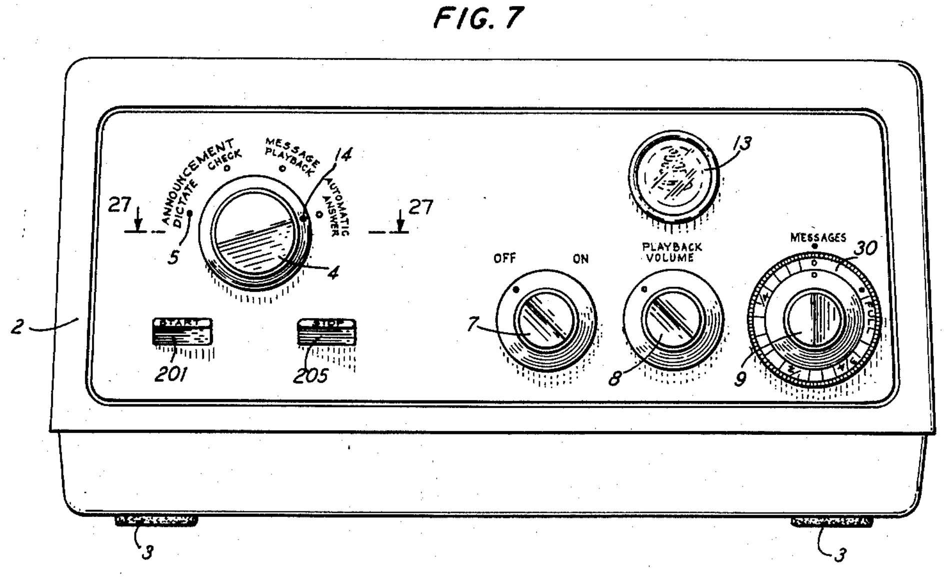
Fig. 7 is a front view of the cabinet which houses the mechanism of which the telephone answering and message recording device is made up.

Referring now particularly to Fig. 6, it will be noted that solenoid 151, when energized, operates against the restraining influence of coil spring 618 and through the linkage member 619 to move cam shaft 612 to the right, thereby causing the disc 614, which is fixed to the shaft to engage the friction disc 613. Thus, the cam shaft 612 with its circuit controlling cams 620, 621 and 622 are effectively coupled to gear 611 which is driven from the main shaft 602 through gear 604. The cams 620, 621 and 622 accordingly start rotating simultaneously with the release of the announcement drum 131 and perform control functions which will be described presently.

It will be noted that the element 626, which is fixed to the shaft 612 so as to rotate therewith in a clockwise direction, moves away from "stop" 629 and tensions the cam-restoring spring 625 which has one end anchored to an offset lug on the element 626 and the other end similarly anchored to a similar lug on the element 627 which is rigidly mounted on the cam shaft 608 and normally abuts the "stop" 633. The spring 625 passes over a guide pulley 628 and, as is apparent, serves as a common means for restoring both cam shafts 608 and 612 to normal condition.

Before describing the third function of solenoid 151 which has to do with the operative association of the recording or reproducing head 803 with the recording drum 131 and the coupling of the carriage 800 with the lead screw 801, it will serve the purpose of clarity to describe first the operation of solenoid 128 and the controls exercised thereby. Reference accordingly is made particularly to Figs. 13 and 21.

When relay 202 operates as previously described, solenoid 128 is energized in a circuit extending from positive battery P1+, over the outermost right armature and front contact of relay 202, conductor 212, contact P of switch unit S–36 of function switch FS, conductor 213, winding of solenoid 128 to ground. Solenoid 128 operates in this circuit and, in withdrawing its plunger 132, causes bail 812 to be rotated clockwise on the rod 813 through the linkage 133 which couples the plunger 132 and the bail 812, as illustrated. The cross-bar of the bail 812 has fixed to its under surface a friction pad 820 which normally rests upon the pivoted member 814 so as to force it into engagement with the stationary bar 815 and thereby normally restrain the member 814 against pivotal movement about the rod 816.

Upon operation of solenoid 128, bail 812 is actuated so as to release the switch carrier 814 for movement in either direction. It moves in a direction opposed to the direction of the force exerted by coil spring 817 when the recording head carrier 800 is moved laterally to the right. The member 814 carries at its outer end the microswitch 117 which, as hereinbefore indicated, is characterized as an "adjustable limit" switch. This switch, per se, forms no part of the present invention; suffice it to say that so long as the member 814 is free to move, the switch contacts remain unoperated or in their normal condition, but once the movement of this member is arrested the switch contacts are actuated when engaged by the arm 810 which is fixed to and moves with the carriage 800 (Fig. 13).

When solenoid 151 operates, as described, it causes the bail 806 to turn counterclockwise on the rod 805 which, together with the rod 804, constitutes slide bars upon which the carriage 800 is free to move laterally in either direction.

The counterclockwise movement of bail 806 causes the upper end of the carriage 800 to approach the drum 131 until the half-nut 802 associated with the carriage engages and meshes with the lead screw 801. The lead screw rotates with the drum 131 under control of motor M. The same motion of the bail causes the recording head 803 to come in contact with the drum. The recording head 803 carried by the carriage 800, because of the coupling of half-nut 802 and lead screw 801 moves across the face of the drum 131 and traces a helical track thereon. In practice the drum rotates once in approximately three seconds so that a thirty-second message requires ten revolutions, or a space on the drum one inch in width, it being understood that there is a 0.10-inch spacing between track centers.

The carriage 800 rides laterally on the rods 804 and 805, the latter constituting a pivot about which the carriage swings. Rod 804 lies between the two depending legs of the bail 806, which is thus fixed against front and back movement. The bail 806 carries a spring-tensioned pulley 807 which, through the medium of a tie piece, or cord 808, one end of which is fixed to a lug 809 on the carriage, is rotated as the carriage moves to the right and the spring tensioned accordingly. This mechanism serves to restore the carriage 800 to its normal position when the half-nut 802 and lead screw 801 become disengaged as will be referred to in greater detail hereinafter.

Solenoid 128 besides controlling the release of the switch carrying arm 814, as described, also controls the operation of erase coil 130 in a manner now to be described.

In order to erase any announcement previously recorded on the announcement drum 131 the erase coil 130 is provided. When solenoid 128 operates, this coil is moved up to the drum 131 in a manner which will be best understood by referring to Figs. 13, 21 and 32 which illustrate various stages in the cycle of operation of a preferred form of mechanism for accomplishing the desired purpose.

When solenoid 128 operates, the plunger 132 moves to the right causing elements 133 and 134 to move in the same direction. Actually, the element 134 is a latch which is pivotally mounted on 133 at 135. The latch 134 normally overhangs the latch pin 136 which is rigidly fixed to the erase coil carrier 137 which, in turn, is pivoted at 138 for clockwise movement thereabout under control of solenoid 128.

As the latch 134 moves to the right under the influence of solenoid 128, the coil carrier 137 pivots about 138 as long as the latch is in engagement with the pin 136. As the carrier rotates, the coil 130 approaches the surface of the announcement drum 131 until the extension of the carrier 137 reaches "stop" 176.

A trip lever 141 is rotatably mounted on a pin 142 which, in turn, is fixed to the carrier 137. The trip lever may be said to comprise two integrally joined extensions 143 and 144 and is normally biased against a "stop" 146 by the biasing spring 145. As will be described more fully hereinafter, the announcement drum 131 is caused to rotate counterclockwise, viewing the several figures. During the time the drum has traveled from the position shown in Fig. 13 (almost one revolution), the position of trip lever 141 has been so altered that the upper extension 144 lies in the path of the pin 148. As the drum continues to rotate past the position shown in Fig. 21, the pin 148 engages extension 144 and causes the lever to be rotated clockwise about the pivot 142 and against the restraining influence of spring 145. As this clockwise movement of the lever continues, the extension 143 engages the under surface of the lateral projection 150 of latch 134 and lifts it clear of the pin 136 thus permitting the erase coil carrier 137 to return to its normal position shown in Fig. 13. As will appear from a later description the solenoid eventually is deenergized causing the plunger 132 and latch elements 134 and 133 to move to the left, during which movement the cam face of the latch rides up and over the pin 136 and drops back into latching engagement therewith.

Thus far the solenoids 128 and 151 have operated and as a result, the erase coil 130 has been moved into close proximity to the announcement drum 131; the stop pawl 700 has been disengaged from the drum 131 to free the latter for rotation; the adjustable limit switch 117 has been freed; and the recording head 803 is moved into operative association with the drum 131 and, because of the engagement of half-nut 802 with lead screw 801, traverses the face thereof.

Figure 21:
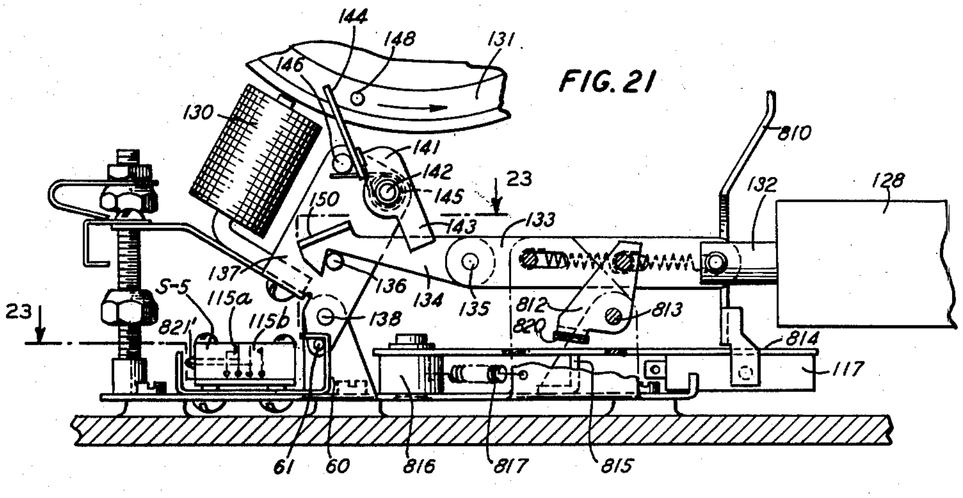
Fig. 21 is a side view of the erase coil of the talk-out component and its controlling mechanism.
Figure 23:
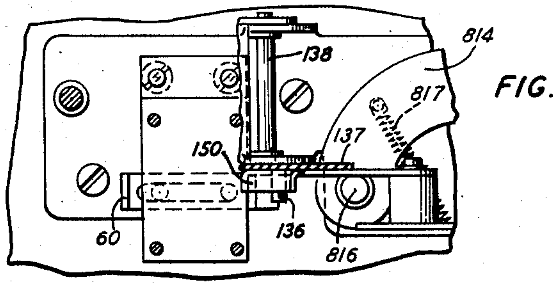
Fig. 23 is a fragmentary section taken along the line 23—23 of Fig. 21, looking in the direction of the arrows.

It will be observed, by referring to Figs. 13 and 21, that switch contacts **115*a* are closed while the erase coil is located in close proximity with the drum 131. The mechanism for controlling the contacts of switch S5 include the slidable bracket 60 having one end hooked over a pin 61 on the carrier 137 and the other end adapted to control the contact-operating button 821'. By referring to Fig. 1 it will be noted that switch contacts 115*a* complete a circuit for erase coil 130 which may be traced from the upper terminal of the alternating-current source 121, over the contacts of thermal switch 126, conductor 125**, contacts *a* of switch 100, conductor 124, switch contacts **115*a*, erase coil 130, conductor 122, to the lower terminal of source 121. Thus, the erase coil 130 is energized from source 121 as long as switch contacts 115*a* are closed, that is, during one revolution of the drum 131. The coil 130 is an iron core coil having a face approximately the length of the recorded area on the drum so that the entire helical track is erased in one revolution. At the end of the single revolution of drum 131 the erase coil 130 restores to normal position as described, thus restoring the contacts of switch 115** to normal.

With solenoid 151 energized and operated, as described, the cams 620, 621 and 622 rotate counterclockwise (Fig. 6) under the influence of motor M. After cam 620 has rotated through a small arc, the contacts S–13 close, causing lamp 405 to be lighted in a circuit extending from positive battery P+, over cam contacts S–13, conductor 156, contacts P of switch unit S–37, conductor 230, filament of lamp 405, to ground. Lamp 405 serves to advise the subscriber that he may start recording.

With relay 219 operated, as described, relay 409 operates in a circuit extending from the ungrounded terminal of rectifier X1, over resistance 301, conductor 112, switch contacts **115*b*, conductor 157, second right armature and front contact of relay 219, conductor 231, winding of relay 409**, to ground.

Relay 409, at its third outer right armature and back contact removes resistance 310 from the circuit normally shunting the filaments of bias oscillator V5 and the automatic volume control tube V4 thus starting the oscillator and activating the volume control circuit.

At its innermost right armature and front contact, relay 409 completes the following circuit involving the announcement head 803 of the announcement unit A: ground, coil of announcement head 803, conductor 158, contact P of switch unit S–21 of the function switch FS, conductor 232, front contact and innermost right armature of relay 409, conductor 408, resistance 208, coil 311 of transformer T3, resistance 399, condenser 398, to the plate of amplifier tube V3. Thus, the announcement head is connected to the output of the amplifier AMP.

It will be observed that the telephone set 102 is now connected to the amplifier input over the following circuit: from the tip conductor T of the subset, over contact *h* of switch 100, conductor 104, contact P of switch unit S–30 of function switch FS, condenser 233, contact P of switch unit S25 of switch FS, conductor 234, coil 309 of transformer T2, conductor 410, contact P of switch unit S–31 of function switch FS, conductor 235, contact *e* of switch 100, to the ring conductor R of the subset. This circuit is extended from ground on conductor 328 to the input of the amplifier AMP by way of coil 314 of transformer T2 which is inductively coupled to coil 309, thence by way of a voltage divider comprising resistances 312 and 313, conductor 315, left armatures and front contacts of relay 409, conductor 411, to the grid of tube V1 of the amplifier. Any message spoken into the transmitter at station 102 is thus amplified and impressed on the recording head 803 of the announcement or talk-out unit A and is recorded, in well-known manner, on the recording medium thereof.

The lighting of lamp 405, previously described, occurs about three and one-half seconds after the start button (switch 201) is actuated, its illumination being under control of cam switch S–13. Thus the subscriber is advised three and one-half seconds after the actuation of the start switch to commence speaking the announcement message into the transmitter of his telephone set. It is during this approximate period that the erase coil 130 is in operative association with the drum 131 and contacts **115*a*** are closed to energize the coil.

As the announcement is being recorded on drum 131 the adjustable limit switch 117 is moved bodily under the influence of the recording head-carriage 800, which, as previously described, controls the movement of the switch through the arm 810. The switch 117 thus advances to the right as the length of the recorded announcement increases.

Power for the subset transmitter is supplied over a circuit which may be traced from the right terminal of rectifier X2, through resistance 316, conductor 317, resistance 414, conductor 415, conductor 235, contact *e* of switch 100, ring conductor of R subset 102 to the subset transmitter circuit (not shown), tip conductor T of the subset, contact *h* of switch 100, conductor 104, resistance 200, to ground.

Shortly before the end of the maximum period allowed for recording an announcement on the drum 131, the cam 620, by means of its teeth 623 causes the contacts S–13 to be interrupted at a predetermined rate and to correspondingly interrupt the circuit to lamp 405. The lamp, accordingly, is flashed as a warning signal to the subscriber that the time permitted for recording an announcement is about to end.

When the subscriber finishes recording the announcement he momentarily actuates the "stop" button (switch 205). The locking circuit for relay 202 thereupon is interrupted and the relay releases its armatures. Solenoids 151 and 128 thereupon are deenergized and their plungers assume normal positions.

When solenoid 128 is deenergized, the clamping bail 812 with its friction pad 820 drops back into engagement with the switch carrier 814 causing the switch 117 to be effectively locked in the position to which it was moved by the carriage 800 during the recording of the announcement or advisory message. This position corresponds to the end of the announcement.

Further, with the deenergization of solenoid 128 the latch 134 is thrust forward as the plunger 132 moves to the left, causing the front edge thereof to ride up and over the latch pin 136 whereupon the latch drops down into latching engagement with the pin.

When solenoid 151 is deenergized, the bail 806 moves clockwise (Fig. 13) causing the recording head carrier 800 to move similarly so as to effect the disengagement of the half-nut 802 from the lead screw 801. Upon this disengagement, the spring 64 associated with the pulley 807 functions to cause the latter to rewind the cord 808 causing the carrier 800 and therefore the recording head 803 to return to normal position. The switch 117, however, retains the position to which it was moved during the recording of the announcement and is now displaced from the depending arm of member 810 by a distance which is a measure of the length of the recorded announcement.

Also when solenoid 151 is deenergized, the end of pawl 700 is permitted to move, under the action of spring 702, in the direction of drum 131 to eventually enter the slot 701 and thereby arrest the rotational movement of the drum.

Solenoid 151, deenergized, also permits spring 618 (Fig. 6) to function and restore the link member 619 to normal which results in the disengagement of clutch members, or discs, 614 and 613 and the consequent release of cam shaft 612. As the shaft 612 is freed, the cams carried thereby are indexed, or restored to their normal positions under the action of coil spring 625. The member 626 is brought to rest in its normal position when it engages the "stop" 629.

It will be observed that relay 402 remains operated until the announcement drum 131 is stopped by the entry of the "stop" associated with pawl 700 into slot 701 in the drum surface. This is made possible because of the substitute energizing circuit for relay 402 which is traced from the right terminal of rectifier X1, through resistance 301, conductor 112, switch contacts 119, conductor 210, winding of relay 402, to ground. The contacts 119 are shown in Fig. 24 in open position which is attained when the drum 131 is indexed, that is, when the pawl 700 drops into slot 701. During the energization of solenoid 151 and until actual entry of slot 701 by the pawl is effected, this contact is in its closed position and thus maintains relay 402 energized in the circuit just described.

In the event the subscriber does not actuate the "stop" button 205, the recording head 803 and its carrier 800 continue to move across the drum 131 until the switch carrier 814 reaches the extreme limit of its pivotal movement about the pin 816 which occurs when it engages the right leg of bail 812 or some other similar "stop." When this occurs, the member 810, because of the tendency of the carrier 800 to continue its travel, acts upon the contacts 117*a* of switch 117 causing them to open and thereby to interrupt the locking circuit to relay 202. Relay 202 thereupon releases and restores the equipment to normal as described. Thus, the telephone answering set is restored to stand-by condition and lamp 400 is relighted in its original energizing circuit.

If the subscriber does not desire to check the recorded announcement and if he does not need the services of the answering set at once, the "on-off" key is restored to "off" and the telephone subset is reconnected to line L; the telephone answering and message recording device is disconnected from the line; and lamps 405 and 430 are extinguished.

*Announcement-check*

When the subscriber desires to check the announcement message recorded on the announcement drum 131 in the manner just described, he operates the "on-off" switch 100 to the "on" position; the knob 4 of function switch FS is set on "announcement-check"; "start" button 201 is momentarily operated and the telephone handset is removed from its support.

Ready lamp 400 is lighted in a circuit extending from positive battery P+, contact R of switch unit S–29 of switch FS, conductor 108, switch contacts 109, conductors 300 and 403, back contact and left armature of relay 402, resistance 401, filament of "ready" lamp 400, conductor 106, contacts *b* of switch 100 to ground.

When the "start" button 201 is momentarily pressed, relay 202 operates in a circuit extending from positive battery P+, contacts of "start" button 201, contact R of the switch unit S–28 of switch FS, conductor 204, winding of relay 202, to ground.

Relay 202, operated, locks in a circuit which is traced from ground, through the winding, front contact and innermost left armature of relay 202, contacts of "stop" button 205, contact R of switch unit S–27, conductor 206, switch contacts 111, contacts 117*a* of "adjustable limit" switch 117, conductor 112, resistance 301, to the ungrounded terminal of rectifier X1.

Relay 202, operated, causes relay 402 to operate in a circuit extending from battery P1+, middle right armature and front contact of relay 202, conductor 210, winding of relay 402, to ground.

Relay 402 operates and performs the same functions heretofore ascribed to it under the heading "Announcement-Dictate" such as starting the operation of motor M, applying power to amplifier AMP and extinguishing the "ready" lamp 400.

Relay 202 also causes the energization of solenoid 151 in a circuit which is traced from battery P1+, middle left armature and front contact of relay 202, innermost left armature and back contact of relay 219, conductor 254, contact R of switch unit S–23 of switch FS, conductor 227, winding of solenoid 151, to ground.

It will be observed that, under this condition, solenoid 128 is not energized as its operating circuit is open at switch unit S–36 of switch FS so that erase coil 130 is not energized, nor is it moved into close proximity to the recording medium of drum 131.

Solenoid 151 performs the same functions heretofore described and which need not be repeated at this time. Suffice it to say that pawl 700 is disengaged from announcement drum 131 to permit the drum to rotate, and the half-nut 802 of the recording head carrier 800 is moved into engagement with the lead screw 801 so as to permit the recording head to move across the drum 131 in the track traced on the recording medium during the recording of the announcement thereon.

The announcement drum recording head 803 is now connected to the input of amplifier AMP in a circuit extending from ground, through the coil of recording head 803, conductor 158, contact R of switch unit S–22 of switch FS, conductor 238, back contact and outer left armature of relay 409, conductor 411 to the grid of vacuum tube V1 of the amplifier AMP.

The amplifier output circuit may be traced from the plate of tube V3, through the primary, or right winding of transformer T1 which receives power from rectifier X2 by way of filter elements 325, 327 and 326. The speech currents induced in coil 320 of transformer T1, the lower terminal of which is grounded, travel over conductor 321, outermost right armature and back contact of relay 409, conductor 416, coil 314 of transformer T2, to ground by way of conductor 328. The receiver at substation 102 is connected across the coil 309 of transformer T2 by way of the tip conductor T of the substation circuit, contact *h* of switch 100, conductor 104, contact R of switch unit S–30 of switch FS, condenser 233, resistance 239, contact R of switch unit S–25 of switch FS, conductor 234, through the coil 309 of transformer T2, conductor 410, contact R of switch unit S–31 of switch FS, conductor 235, contact *e* of switch 100 and the ring conductor R of the substation circuit.

Thus, with the head 803 connected to the amplifier input and the receiver at substation 102 connected to the amplifier output, the announcement message recorded on the announcement drum is reproduced in the telephone receiver and heard by the subscriber.

If desirable, an auxiliary headset may be employed in listening to the recorded announcement. In this case the headset would be plugged into the jack 240 which may be conveniently located on the face of the cabinet housing the apparatus.

The announcement cams 620, 621 and 622 rotate during this period but perform no operating functions.

At the end of the announcement, the bracket member 810 associated with the recording head carrier 800 engages the microswitch (adjustable limit switch) 117 causing the contacts thereof to be operated. Contacts 117*a* thereof open, thus interrupting the locking circuit for relay 202 causing this relay to release its armatures. Solenoid 151 thereupon is deenergized.

With the deenergization of solenoid 151 the recording head carriage 800 and the announcement cams return to stand-by positions in a manner previously described.

Should the "stop" button 205 be pressed before the adjustable limit switch 117 operates, relay 202 immediately releases to perform the release functions described.

Relay 402 remains operated until announcement drum 131 is indexed because contacts 119 are held closed by the clutch pawl 700 until indexing is completed. Contacts 119 complete a substitute circuit for contacts on relay 202 which includes conductor 112, resistance 301 and the right terminal of rectifier X1. When relay 402 releases, lamp 400 relights.

Restoration of switch 100 to its off position extinguishes the "ready" lamp 400, disconnects the telephone message answering set from the substation and connects the latter to the station line circuit L.

*Automatic answer*

When the subscriber at station 102 leaves the premises, or for some other reason desires to have calls incoming to his station answered automatically and incoming messages recorded, he operates the "on-off" switch 100 to the "on" position and turns the knob 4 of function switch FS to the automatic answer position designated "automatic answer."

In the description immediately following it will be assumed that the recording head 160 is in position to receive a message and that other messages have already been recorded. A description of the recording of the first incoming message will be made hereinafter. Under the assumed condition switches 109, 110, 111 and 118 are closed.

"Ready" lamp 400 is lighted in a circuit extending from battery (P+), contacts 118, contacts 109, conductors 300 and 403, back contact and left armature of relay 402, resistance 401, filament of lamp 400, conductor 106, to ground at contact *b* of switch 100.

Assuming a call is originated at calling station 162 and intended for station 102, it will be extended to the called station in the usual manner either manually or automatically. In the illustrated embodiment of the invention the call is assumed to have been originated at a dial station, in which case the connection is completed to the called station by way of automatic switches such as a line finder, first and second selectors and a connector all of which are schematically disclosed. When the connector seizes the called line L and finds it idle, ringing current is transmitted from the central office source 80 to the called station in well-known manner.

Ringing current from the central office traverses the following path at substation 102: from the ring conductor of the line L, over contact *c* of switch 100, conductors 164 and 165, condenser 242, thermistor 243, unidirectional current conducting device or dry rectifier 244 and the parallel-connected left winding of ringing relay 245, conductor 246, switch contacts 120, conductors 191 and 166, contact T of switch unit S–35, conductor 167, switch contacts 110, conductors 168 and 169 to telephone ground at 170.

Relay 245 operates in this circuit and locks up in a circuit extending from ground through its right winding, through resistance 250, front contact and innermost right armature of relay 245, middle left armature and back contact of relay 219, conductor 251, contacts 252 of cam switch S–14, contacts of cam switch S–16, conductor 161, contact T of switch unit S–34 of switch FS, conductor 155, conductor 253, and switch contacts 118, to battery (P+).

Relay 202 now operates in a circuit extending from ground, through the winding of relay 202, middle right armature and front contact of relay 245, conductor 253, to battery P+ by way of switch contact 118.

Relay 402 now operates in a circuit which is traced from ground, through the winding of relay 402, conductor 210, front contact and middle right armature of relay 202, to battery P1+. Relay 402, operated, causes motor M to operate, energizes the amplifier AMP, and extinguishes the lamp 400 in the manner described hereinbefore.

Relay 202 also causes solenoid 151 to operate in a circuit which includes conductor 227, contact T of switch unit S–23 of switch FS, conductor 254, back contact and innermost left armature of relay 219, front contact and middle armature of relay 202 to battery (P1+).

Solenoid 151 operates to perform the functions heretofore ascribed to it and in a manner hereinbefore described. As a result, the announcement drum 131 rotates as do also the announcement drum cams 620, 621 and 622. Also the recording head 803 of the announcement unit is moved into operative association with the drums and because of the coupling effected by half-nut 802 and lead screw 801, the head is caused to move across the drum in the track previously traced thereby.

Approximately three and one-half seconds after the first ringing signal, cam 622 functions to close contacts S–15 whereupon a direct current termination of the telephone connection is completed. This termination extends from the ring conductor R of the line L, contact *c* of switch 100, conductor 164, contacts S–15 of cam 622, conductors 172 and 255, winding of relay 418, conductor 419, contacts 173 of cam switch S–14, conductor 174, back contact and outermost left armature of relay 219, conductor 256, contact T of switch unit S–30 of switch FS, conductors 257 and 258, contact *f*T of switch 100, to the tip conductor of line L.

The connection of this circuit across the line simulates the removal of the telephone from its support at station 102 and serves to trip the ringing current and to perform otherwise in a supervisory role in well-known manner.

Relay 418, which, for reasons which will appear from a description to be made hereinafter, is appropriately characterized as the "calling party disconnect" relay, operates on central office battery 175 in the circuit just traced and locks in a circuit which is independent of contacts 173 of cam switch S–14 and may be traced from the ring conductor R of line L, contact *c* of switch 100, conductor 164, contacts S–15 of cam 622, conductors 172 and 255, winding of relay 418 and its front contact and left armature, conductor 420, contact T of switch unit S–30 of switch FS, conductors 257 and 258, contact *f* of switch 100, to the tip conductor T of line L. Thus relay 418 is held operated on battery supplied from the central office. Such battery is indicated at 175 in Fig. 1.

The announcement, or talkout message previously recorded on the announcement drum 131 now is transmitted over the established connection to the calling station 162. The speech transmitting circuit may be described as follows: the grounded announcement head 803 is connected to the amplifier input by way of conductor 158, contact T of switch unit S–22 of switch FS, conductor 238, back contact and outer left armature of relay 409, conductor 411, to the grid of tube V1 of amplifier AMP; the amplifier output is connected to the line L by way of the primary winding and coil 320 of transformer T1, conductor 321, outermost right armature and back contact of relay 409, conductor 416, inductively coupled coils 314 and 309 of transformer T2, the lower terminal of the latter, conductor 410, contact T of switch unit S–31 of switch FS, conductor 172, closed contacts S–15 of cam 622, conductor 164, contact *c* of switch 100, to the ring conductor R of line L, thence over the established connection to the calling station and back by way of the tip conductor T of line L, contact *f* of switch 100, conductors 258 and 257, contact T of switch unit S–30 of switch FS, condenser 233, contact T of switch unit S–25 of switch FS, conductor 234 to the upper terminal of coil 309 of transformer T2. Thus the message on the announcement drum is amplified and transmitted to station 162.

About one second after the telephone line L is terminated by the winding of relay 418, as described, cam 621 opens contacts 252 of cam switch S–14 so that the direct-current termination of the line L is dependent on the holding of relay 418 through its locking contacts. It will be noted that relay 245 now is locked operated under control of the cam switch contacts S–16 and relay 418 in a circuit which extends from ground, through the right winding of relay 245, resistance 250, front contacts and innermost right armature of relay 245, conductor 299, right armature and front contact of relay 418, conductor 298, contacts of cam switch S–16, conductor 161, contact T of unit S–34 of switch FS, conductors 155 and 253, switch contacts 118 to battery P+. Any interruption of central office battery now causes relay 418 to release which causes the answering set to return to standby condition by causing the release of relay 245 which, in turn, releases relays 202 and 402. These operations will be more fully described in connection with a disconnect by the calling party after the transmission of a message by him for recording at the called station.

Should the calling party at station 162 disconnect during the transmission of the announcement message from the called station, the open contacts 120 associated with the announcement drum clutch or pawl 700 (Fig. 24) prevent a new call being received until the drum 131 and cams 620, 621 and 622 are indexed. This results from the fact that the operating circuit for ringing relay 245 is carried through the contacts 120 and this circuit is incomplete as long as the contacts 120 are open, that is, as long as announcement drum 131 is out of its normal position or in the process of having its recorded message transmitted over the established connection.

At the end of the announcement, adjustable limit switch 117 operates in the manner previously described. However, in the present case the switch carrier 814 has been moved to a position which is determined by the length of the recorded announcement, as previously indicated, and solenoid 128 has not been energized so that the switch is effectively mechanically locked in its advanced position. When solenoid 151 operates, as described, and the half-nut 802 moves into engagement with the lead screw 801 the recording head carrier moves laterally until the operating arm 810 associated therewith engages and operates the adjustable limit switch 117.

Upon the operation of adjustable limit switch 117, relay 219 operates in a circuit extending from ground, through the winding of relay 219, conductor 218, contact T of switch unit S–33 of switch FS, conductor 260, contacts 117*b* of switch 117, conductor 112, resistance 301 to the ungrounded or right terminal of rectifier X1.

Relay 219 locks operated in an obvious circuit which includes the front contact and outermost left armature of relay 202.

Relay 219, by means of its third right armature and front contacts, takes over the holding of the telephone connection from cam switch S–15, it being observed that these relay contacts are connected in shunt with the contacts of switch S–15 by way of conductors 165 and 172. Thus, during the announcement period, the telephone connection is held by way of cam switch S–15 and after the announcement period and during the recording of an incoming message, by contacts of relay 219.

When relay 219 operates, it opens its innermost left back contacts to interrupt the circuit to solenoid 151 causing the release of this solenoid. The release of solenoid 151 causes the disengagement of half-nut 802 from lead screw 801 and the spring on pulley 807 returns the recording head carriage 800 to normal position; cams 620, 621 and 622 are indexed by the action of spring 625 and the rotation of announcement drum 131 is arrested by the entry of pawl 700 into slot 701.

Relay 418 remains locked up to central office battery 175.

Solenoid 153 now operates in a circuit which extends from ground, through the winding of solenoid 153, conductor 261, contact T of switch unit S-24 of switch FS, conductor 226, switch contacts 141, conductor 225, front contact and innermost left armature of relay 219, front contact and left middle armature of relay 202 to battery P1+.

Figure 30:
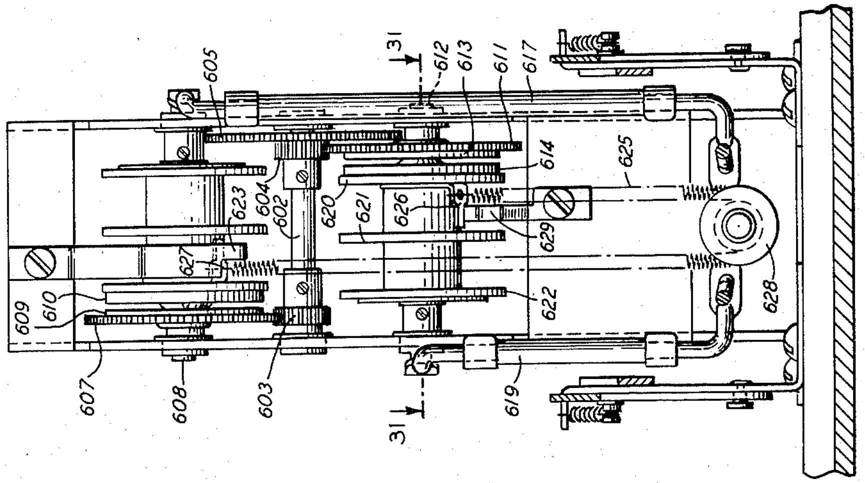
Fig. 30 is a section taken along the line 30—30 of Fig. 15, looking in the direction of the arrows.

The solenoid 153 is similar, functionally, to solenoid 151 in that it operates a clutch pawl 823 similar to pawl 700 associated with the incoming drum 177 to permit rotation of the drum by motor M; causes the engagement of carriage 800′ for recording head 160 with the lead screw 801′ to permit the recording head to move across the incoming drum; and as shown in Figs. 6 and 30, causes the engagement of clutch members 609 and 610 whereby the cams 630, 631 and 632, fixed to shaft 608, start rotating. Solenoid 153, in enabling the clutch comprising members 609 and 610 operates through the link 617 against the restraining influence of spring 616.

Relay 409 operates in a circuit extending from the ungrounded terminal of rectifier X1, through resistance 301, conductor 112, contacts 115*b* of switch 115, conductor 157, second right armature and front contact of relay 219, conductor 231, winding of relay 409, to ground.

The telephone line L now is connected to the input of speech amplifier AMP in a circuit which may be traced from the ring conductor R of the line, contact *c* of switch 100, conductors 164 and 165, third right armature and front contact of relay 219, conductor 172, contact T of switch unit S-31 of switch FS, conductor 410, coil 309 of transformer T2, conductor 234, contact T of switch unit S–25, condenser 233, contact T of switch unit S–30 of switch FS, conductor 257 and 258, contact *f* of switch 100 to the tip conductor T of line L; thence, by induction, from coil 309 to coil 314 of transformer T2, the lower terminal of which is grounded, thence by way of the voltage divider comprising resistances 312 and 313, conductor 315, the two front contacts and left armatures of relay 409, conductor 411 to the grid of tube V1 of amplifier AMP. The condensers associated with winding 309 of transformer T2 serve to reduce the transmission of 60 cycle components from the power supply into the amplifier by way of capacitances in the transformer windings and between the telephone and power grounds.

The output of speech amplifier AMP is connected to the message recording head 160 over a circuit which may be traced from the plate of tube V3 of amplifier AMP, condenser 398, resistance 399, coil 311 of transformer T3, resistor 208, conductor 408, innermost right armature and front contact of relay 409, conductor 232, contact T of switch unit S–21 of switch FS, conductor 178, coil of recording head 160 to ground.

Any message the calling subscriber may care to transmit will now be recorded on the incoming message drum by the recording head 160.

At approximately one-half second after the adjustable limit switch 117 operates to effect the start of the recording drum 177, cam 631 operates to close contacts 179 and open contacts 180 twice in succession to cause the transmission of "beep" tone signals (spaced approximately one second apart) on the line as a signal to the calling subscriber to start talking. The circuits involved in the transmission of the "beep" signals are as follows: the tone generator coil 181 which is mounted on the driving motor M, resistances 182 and 183, lower contacts of cam switch S–18, conductor 184, to the grid of tone amplifying tube V6, plate of tube V6, primary winding of transformer T2, conductor 331, contact T of switch unit S–32 of switch FS, conductor 262, contact 179 of cam switch S–17, conductors 263 and 264, resistance 327 to the ungrounded terminal of rectifier X2. This plate circuit of amplifying tube V6 is normally open and is closed to power at rectifier X2 only when the contacts 179 of cam switch S–17 are closed. The normally closed contacts 180 of cam switch S–17 normally maintain power from rectifier X2 connected to the plate of automatic volume control tube V4 and since the closure of contacts 179 of cam switch S–17 is accompanied by the opening of contacts 180 thereof, the AVC circuit is disabled during the transmission of the "beep" signals. As coil 309 of transformer T2 is inductively coupled to the primary winding thereof and as the former is connected across the telephone line L, as previously described, the "beep" signal is caused to be transmitted over the line to be heard by the party at the calling station 162.

When approximately twenty-five seconds of the incoming message recording interval have elapsed a third "beep" signal is sent out on the line by the operation of cam 631 and the contacts 179 of cam switch S–17.

Cam 630 operates cam switch S–18 at such a time in the cycle that the operation of switch S–18 overlaps the fourth operation of contacts 179 of cam switch S–17 by cam 631 so that the fourth and last "beep" is five decibels higher in level than the others and follows the third "beep" after a one second interval. This volume increase is effected by the inclusion of resistance 182 in the tone circuit.

The last two "beep" signals and particularly the amplified fourth signal serve to advise the calling party at station 162 that the recording interval is about to end and that speech transmission should be terminated.

Approximately two and one-half seconds after the last "beep" signal is transmitted and thirty seconds after the recording interval started, cam 632 functions to open cam switch S–16 causing the release of relay 245. When relay 245 releases, all operated relays and solenoid 153 release; motor M is deenergized; the incoming message drum 177 stops; and the cams 630, 631 and 632 return to zero position. This last operation is effected by the action of spring 625 which, during the recording interval is continuously stretched or tensioned and which, upon the disenagement of the clutch members 609 and 610, incident to the deenergization of solenoid 153, acts upon the anchor piece 627 and restores it to normal position in which it abuts the stop 633.

When relay 219 releases, the line circuit is open and the answering set is ready to receive another call.

If the telephone line current should be interrupted for a short time, as by a calling party disconnect, before the thirty-second incoming message recording time has elapsed, relay 418 releases, stopping all motion of the answering set and restoring it to stand-by condition. The receipt of ringing current will again set the device in motion.

It should be understood that at the end of each incoming message the recording head 160 remains in the position to which it has been advanced so that a plurality of messages, up to the capacity of the recording drum 177, may be recorded.

When the incoming message recording head 160 reaches the point on the drum 177 where enough magnetic recording material remains for only thirty-five seconds of message recording, switch contact 109 is opened by cam 26 (Fig. 25) to interrupt the circuit to "ready" lamp 400 so that this lamp will not light. A short distance further along the incoming message drum, equivalent to five seconds of message recording time, the cam 26 opens switch contacts 110. The opening of these contacts breaks the connection to telephone ground 170 and a "don't answer" condition is presented to subsequent incoming calls. After the head traverses an additional distance, equivalent to thirty seconds of message recording, contacts 111 are operated and open the circuit to solenoid 153 for a purpose which will appear more fully from a later description. Suffice it to say at this time that the opening of the circuit to solenoid 153 precludes the possibility of the record-reproduce head 160 running off the end of the drum if the subscriber starts to play back without turning the scanning knob to zero position.

*Message playback*

When the subscriber at station 102 returns to his premises or otherwise becomes available at the substation he may cause the messages recorded during his absence to be reproduced in the receiver of his telephone set. To have the recorded messages played back in this manner the "on-off" switch 100 is actuated to its "on" position; the knob of function switch FS is turned to the position designated "message playback"; the telephone handset is lifted from its support; and "start" button 201 is actuated momentarily.

The operation of the "on-off" switch to the "on" position disconnects the telephone set at station 102 from the line L.

Relay 202 now operates in a circuit extending from ground, through the winding of relay 202, conductor 204, contact W of switch unit S–28 of switch FS, contacts of "start" switch 201, to battery P+. Relay 202 locks by way of its innermost left armature and front contact, contacts of "stop" switch 205, contact W of switch unit S–27 of switch FS, conductor 206, contacts of switch 111, contacts 117*a* of adjustable limit switch 117, conductor 112, resistance 301, to the ungrounded terminal of rectifier X1.

Relay 202, operated, causes relay 402 to operate in a circuit which includes conductor 210, the front contact and middle right armature of relay 202, and battery P1+. Relay 402, in operating, starts motor M, energizes the amplifier AMP, and extinguishes the "ready" lamp 400 over circuits hereinbefore traced.

The solenoid 153 which controls the clutch of the outgoing message drum 177 is operated in a circuit extending from ground, through the winding of solenoid 153, conductor 261, contact W of switch unit S–23 of switch FS, conductor 254, back contact and innermost left armature of relay 219, front contact and middle left armature of relay 202, to battery P1+.

The solenoid 153 performs functions relative to the incoming message drum 177 similar to those performed by solenoid 151 with respect to the announcement drum 131 previously described. Specifically, it acts upon the clutch pawl 823 (Fig. 16) causing the release of the drum 177 for rotation under the influence of motor M. Since the lead screw is geared directly to the drum, it rotates and causes the half-nut to move the carriage so that the head 160 traverses the incoming message drum 177 to reproduce whatever messages may have been recorded thereon; and finally it operates the linkage 617 to move cam shaft 608 laterally to the left (Fig. 6) causing the coupling of the cam shaft 608 to drive shaft 602 by way of the friction clutch which includes the clutch discs 609 and 610.

Under the present conditions the message drum 177 rotates as do also the cams 630, 631 and 632, which, however, perform no useful functions at this time.

The subscriber at station 102 may now listen to any one or all messages which were recorded on the incoming message drum 177 during his absence. He may pick out the messages to be played back from drum 177 by rotating the scanning knob 9. The knob 4 is pushed inward to disengage the half-nut 802' from the lead screw 801' and is then rotated to the desired position and released. An indicator dial 30 which rotates with the drum 177 during the recording of incoming messages serves as an index of the amount of recording space used for the recordings and obviously, therefore, of the amount of recording space remaining for recording. This indicator dial during playback remains stationary.

The recorded messages are reproduced in the subscriber's telephone receiver by way of the following circuits: From ground through the coil of reproducing head 160, conductor 178, contact W of switch unit S–22 of switch FS, conductor 238, back contact and outer left armature of relay 409, conductor 411, to the grid of amplifier tube V1, through the amplifier AMP, to the plate of tube V3, primary coil of transformer T1, by induction to secondary coil 320 one terminal of which is grounded, the other terminal thereof, conductor 321, outermost right armature and back contact of relay 409, conductor 416, coil 314 of transformer T2 to ground; thence by induction to coil 309 of transformer T2, the lower terminal thereof, conductor 410, contact W of switch unit S–31 of switch FS, conductor 235, contact *e* of switch 100, the telephone receiver at station 102, contact *h* of switch 100, conductor 104, contact W of switch unit S–30 of switch FS, condenser 233, variable resistance 266, condenser 267, contact W of switch unit S–25 of switch FS, conductor 234, to the upper terminal of coil 309 of transformer T2. Thus, the subscriber receives, through his telephone receiver, the messages recorded on the drum 177.

The variable resistance 266 serves as a playback volume control to be adjusted, as desired, by the subscriber at station 102.

When the reproduction of the recorded messages has been completed the subscriber returns the telephone to the support and momentarily actuates "stop" button 205 which restores the apparatus including solenoid 153 to normal in a manner now apparent.

When solenoid 153 restores, the clutch discs 609 and 610 are disengaged, permitting the spring 625 to act on anchor member 627 causing the cams 630, 631 and 632 to restore to normal position as determined by the location of "stop" pin 633.

Should the subscriber fail to actuate "stop" button 205, the carriage for recording head 160 continues its travel across the drum 177 until the carriage 800' opens switch contacts 111 when the end of the recording medium on the drum has been reached. The opening of switch contacts 111 serves the same purpose as does the momentary actuation of "stop" button 205. The contacts 111 remain open until the carriage is manually returned by means of the scanning knob to a position further from the end of the drum.

*Incoming message drum erasure*

After having listened to the messages recorded on the drum 177 the subscriber at station 102 may cause them to be erased in the following manner: the "on-off" switch 100 is actuated to the "on" position; the message scanning knob 9 is turned counter-clockwise to zero position; the indicator dial is turned to its extreme counter-clockwise position; the function switch FS is set on "automatic answer"; switch contacts 139 and 140 are now closed. These latter switches are operated by a cam associated with the indicator dial as clearly shown in the Keith-Nickerson patent hereinbefore identified.

"Ready" lamp 400 is now lighted in a circuit extending from battery P+, switch contacts 140, switch contacts 109, conductors 300 and 403, back contact and left armature of relay 402, resistance 401, filament of lamp 400, conductor 106, to ground at contact *b* of switch 100.

When ringing current is applied to line L on the first incoming call to be recorded, relay 245 operates as described under "Automatic-Answer." Relays 202, 402 and solenoid 151 operate in a manner now apparent, starting motor M, enabling amplifier AMP, rotating the announcement drum 131 and its associated cams 620, 621 and 622, and extinguishing "ready" lamp 400.

Relay 422 now operates in a circuit extending from ground, through the winding of relay 422, conductor 423, contacts of cam switch S–44 controlled by cam 622, conductor 424, front contact and outermost armature of relay 245, conductors 270 and 271, switch contacts 139, conductor 254, back contact and innermost left armature of relay 219, front contact and middle armature of relay 202, to battery P1+. In operating, relay 422 locks in a circuit extending from battery P+, outermost armature and front contact of relay 422, conductors 271 and 270, outermost armature and front contact of relay 245, conductor 424, contacts of switch S–44, conductor 423, winding of relay 422, to ground.

Solenoid 153 operates in a circuit which may be traced from ground, through the winding of solenoid 153, conductors 261 and 272, front contact and middle armature of relay 422 to battery P+. Solenoid 153, as described hereinbefore, starts the incoming message drum 177 and its associated cams 630, 631 and 632 rotating.

Solenoid 186, the incoming message erase solenoid, operates in a circuit extending from battery P+, innermost armature and front contact of relay 422, conductor 427, winding of solenoid 186, to ground. Solenoid 186 moves the erase coil 187 up to the drum 177 in the manner previously described. As the erase coil 187 is raised, a contact in switch 116, is closed to connect power to the erase coil.

Index contact 118 returns with the incoming message head carriage and connects contacts 31 and 32, the mechanical parts of switch 118 shown in Fig. 1.

After a little more than one revolution of the incoming message drum 177 (about three and one-half seconds) cam 622 operates switch S–44 to open the contacts thereof which causes relay 422 to release, whereupon the erase coil 187 drops away from the drum 177 and resumes its normal position; erase current is thus cut off by contacts 116 which are now open.

During the interval in which the erase coil was in close proximity with the drum 177 the messages previously recorded thereon are erased.

With relay 422 deenergized and its armatures restored to normal, solenoid 153 is released, whereupon the incoming message drum stops rotating and the incoming message cams 630, 631 and 632 return to zero position. As the incoming message drum erase cycle ends, contacts of cam switch S–15 close to effect the direct-current termination of the line L as previously described.

The remainder of the answering cycle proceeds as under "Automatic-Answer."

The switch contacts 139 and 140 open between the start of erasure of the incoming message drum and the recording of the first incoming message since the lead screw advances the indicator dial mechanism as disclosed. Consequently, erasure does not occur on subsequent calls.

What is claimed is:

1. In a telephone system, a subscriber's telephone line, a central office, a source of signaling current at said central office, a message recorder, a relay associated with said recorder responsive to signaling current transmitted from said central office to said line for controlling the connection of said message recorder to said line, a switch controlling the connection of said recorder to said line, a recorder-operated cam for maintaining said switch operated for a predetermined period of time, said cam having a normal position which determines the start of the said predetermined period of time, a locking circuit for said relay including contacts of said recorder-operated cam, means for restoring said cam to its normal position, and means for enabling said restoring means at any time subsequent to the start of the said predetermined period of time.

2. In a telephone system, a central office, a subscriber's station, a line interconnecting said central office and said station, a recording device at said station having a recording medium bearing a prerecorded message, a reproducing head, a carriage normally supporting said head in close proximity to the start of the prerecorded message on said recording medium, means responsive to a call incoming to said station for connecting said recording device to said line and moving said carriage relative to said recording medium, means for restoring said carriage to its normal position, and means controlled from said central office for enabling said carriage-restoring means.

3. In a telephone system, a central office, a subscriber's station, a line interconnecting said central office and said station, a source of ringing current at said central office, a source of direct current at said central office, a recording device at said station having a recording medium bearing a prerecorded message, a reproducing head, a carriage having a normal position in which it supports said head in close proximity with said recording medium at the start of the prerecorded message, means responsive to current from said ringing current source for connecting said recording device to said line and moving said carriage relative to said recording medium, means for restoring said carriage to its normal position, and means controlled by current from said direct-current source for enabling said carriage-restoring means.

4. In a telephone system, a subscriber's station, a central office, a line interconnecting said station and said office, a message recorder at said station including means for erasing messages recorded thereon and a recording head having a home position, means controlling the operation of the message erasing means of said recorder, means responsive to a call signal transmitted from said central office to said station for operating said message erasing controlling means, and means controlled by the subscriber at said station for rendering said call signal responsive means effective only when said recording head is in its home position.

5. In a telephone system, a subscriber's station, a central office, a line interconnecting said station and said office, a message recorder at said station including means for erasing messages recorded thereon and a recording head having a home position, switching means controlling the operation of the message erasing means of said recorder, means responsive to a call signal transmitted from said central office to said station for operating said switching means, subscriber-controlled means at said station for rendering said switching means effective only when said recording head is in its home position, and timing means for releasing said switching means.

References Cited in the file of this patent

UNITED STATES PATENTS

| | | |
|---|---|---|
| 2,224,244 | Hicks | Dec. 10, 1940 |
| 2,282,100 | Thompson | May 5, 1942 |
| 2,374,842 | Shively et al. | May 1, 1945 |
| 2,519,567 | Handschin | Aug. 22, 1950 |
| 2,519,568 | Handschin | Aug. 22, 1950 |
| 2,539,139 | Jordanoff et al. | Jan. 23, 1951 |
| 2,542,192 | Handschin | Feb. 20, 1951 |
| 2,549,548 | Von Zimmermann | Apr. 17, 1951 |
| 2,558,040 | Carter | June 26, 1951 |
| 2,697,754 | Ranger | Dec. 21, 1954 |
| 2,743,315 | Van Deventer et al. | Apr. 24, 1956 |
| 2,784,254 | Lane | Mar. 5, 1957 |
| 2,816,167 | Muller et al. | Dec. 10, 1957 |